(12) United States Patent
Shin et al.

(10) Patent No.: US 12,154,520 B2
(45) Date of Patent: Nov. 26, 2024

(54) ELECTRONIC DEVICE FOR CONFIGURING BRIGHTNESS OF DISPLAY BY USING ILLUMINANCE SENSOR

(71) Applicant: Samsung Electronics Co., Ltd., Suwon-si (KR)

(72) Inventors: Dongheon Shin, Suwon-si (KR); Taejin Park, Suwon-si (KR); Donghwy Kim, Suwon-si (KR); Jiyong Kim, Suwon-si (KR); Heekeun Park, Suwon-si (KR); Minwoo Lee, Suwon-si (KR); Hoondo Heo, Suwon-si (KR); Minho Kim, Suwon-si (KR); Hyojong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/474,722

(22) Filed: Sep. 26, 2023

(65) Prior Publication Data

US 2024/0029667 A1  Jan. 25, 2024

Related U.S. Application Data

(63) Continuation of application No. PCT/KR2022/008493, filed on Jun. 15, 2022.

(30) Foreign Application Priority Data

Aug. 10, 2021 (KR) .................. 10-2021-0105295

(51) Int. Cl.
*G09G 3/34* (2006.01)

(52) U.S. Cl.
CPC ... *G09G 3/3406* (2013.01); *G09G 2320/0626* (2013.01); *G09G 2354/00* (2013.01); *G09G 2360/142* (2013.01)

(58) Field of Classification Search
CPC .. G09G 3/3406; G09G 5/10; G09G 2360/144; G09G 2354/00;
(Continued)

(56) References Cited

U.S. PATENT DOCUMENTS 8,411,020 B2   4/2013  Yeh
9,330,606 B2   5/2016  Barnhoefer et al.
(Continued)

FOREIGN PATENT DOCUMENTS

JP   2000-111872 A   4/2000
JP      5780848 B2   9/2015
(Continued)

OTHER PUBLICATIONS

International Search Report dated Sep. 16, 2022, issued in International Patent Application No. PCT/KR2022/008493.

*Primary Examiner* — Vinh T Lam
(74) *Attorney, Agent, or Firm* — Jefferson IP Law, LLP

(57) ABSTRACT

An electronic device configured to configure brightness of a display by using an illuminance sensor is provided. The electronic device includes acquiring a second front-surface sensing value smaller than a first front-surface sensing value through a first illuminance sensor while the brightness is a first brightness, comparing the second front-surface sensing value with a first rear-surface sensing value detected through a second illuminance sensor, determining, when the second front-surface sensing value is greater than the first rear-surface sensing value, whether a touch input is detected through a designated region of the display, maintaining the brightness at the first brightness when the touch input is detected, and when the touch input is not detected, adjusting the brightness of the display to a value lower than that of the (Continued)

first brightness, based on a first LUT stored in a memory, or maintaining the brightness of the display at the first brightness.

20 Claims, 14 Drawing Sheets

(58) Field of Classification Search
CPC ..... G09G 2330/026; G09G 2320/0626; G09G 3/20; G09G 2360/142; G06F 3/14; H04M 1/72454; H04M 1/22
See application file for complete search history.

(56) References Cited

U.S. PATENT DOCUMENTS

| | | | |
|---|---|---|---|
| 10,446,093 B2 | 10/2019 | Lee et al. | |
| 10,684,164 B2 | 6/2020 | Kang | |
| 10,818,265 B2 * | 10/2020 | Liu | G09G 5/006 |
| 11,244,995 B2 * | 2/2022 | Cho | G09G 3/3225 |
| 11,380,285 B2 * | 7/2022 | Choi | G09G 3/035 |
| 11,402,260 B2 | 8/2022 | Liu et al. | |
| 11,551,595 B2 * | 1/2023 | Yoon | G01P 15/00 |
| 11,562,670 B2 * | 1/2023 | Cho | G06F 3/0412 |
| 11,573,609 B2 * | 2/2023 | Suzuki | G09G 5/10 |
| 11,615,764 B2 * | 3/2023 | Kim | G09G 5/10 345/204 |
| 12,014,679 B2 * | 6/2024 | Zhang | B01F 25/314 |
| 2014/0375219 A1 | 12/2014 | Lee et al. | |
| 2017/0053604 A1 | 2/2017 | Li et al. | |
| 2018/0218710 A1 | 8/2018 | Park et al. | |
| 2018/0275815 A1 | 9/2018 | Lee et al. | |
| 2020/0035201 A1 | 1/2020 | Tang | |
| 2020/0152724 A1 * | 5/2020 | Cho | G06F 1/1694 |
| 2020/0242985 A1 * | 7/2020 | Cho | G06F 1/1637 |
| 2020/0265799 A1 * | 8/2020 | Choi | G06F 1/1652 |
| 2021/0248942 A1 * | 8/2021 | Yoon | G01P 15/00 |
| 2022/0326734 A1 | 10/2022 | Cho et al. | |
| 2023/0116831 A1 | 4/2023 | Hwang et al. | |

FOREIGN PATENT DOCUMENTS

| | | |
|---|---|---|
| JP | 2018-160239 A | 10/2018 |
| KR | 10-2012-0003423 A | 1/2012 |
| KR | 10-1378407 B1 | 3/2014 |
| KR | 10-2014-0147253 A | 12/2014 |
| KR | 10-2016-0132465 A | 11/2016 |
| KR | 10-2017-0005756 A | 1/2017 |
| KR | 10-2017-0102655 A | 9/2017 |
| KR | 10-2020-0101263 A | 8/2020 |
| KR | 10-2235903 B1 | 4/2021 |
| KR | 10-2021-0084016 A | 7/2021 |
| KR | 10-2022-0136379 A | 10/2022 |

* cited by examiner

ELECTRONIC DEVICE FOR CONFIGURING BRIGHTNESS OF DISPLAY BY USING ILLUMINANCE SENSOR

CROSS-REFERENCE TO RELATED APPLICATION(S)

This application is a continuation application, claiming priority under § 365(c), of an International application No. PCT/KR2022/008493, filed on Jun. 15, 2022, which is based on and claims the benefit of a Korean patent application number filed on Aug. 10, 2021, in the Korean Intellectual Property Office, the disclosure of which is incorporated by reference herein in its entirety.

BACKGROUND

1. Field

The disclosure relates to an electronic device configured to configure the brightness of a display by using an illuminance sensor.

2. Description of Related Art

A portable electronic device may use an illuminance sensor to measure the peripheral illuminance, and may adjust the screen brightness based on the measured illuminance. For example, the portable electronic device may configure the screen dark in a dark environment having a low peripheral illuminance, and may configure the screen bright in an environment having a relatively high peripheral illuminance, thereby improving visibility.

The above information is presented as background information only to assist with an understanding of the disclosure. No determination has been made, and no assertion is made, as to whether any of the above might be applicable as prior art with regard to the disclosure.

SUMMARY

A portable electronic device may configure the brightness of a display to a luminance (e.g., wake up luminance) corresponding to an illuminance (e.g., wake up illuminance) acquired from an illuminance sensor immediately before a display is turned on, and may turn on the display. After the display is turned on, the portable electronic device may perform a hysteresis adjustment operation. For example, when the wake-up illuminance is 10 lux, the down hysteresis may be configured to be 1 lux, and the high hysteresis may be configured to be 81 lux. If the measured illuminance is 1 lux or less, the portable electronic device may configure the screen brightness to a luminance lower than the wake-up luminance. If the measured illuminance is 81 lux or higher, the portable electronic device may configure the screen brightness to a luminance higher than the wake-up luminance.

The portable electronic device may perform a hysteresis adjustment operation while the illuminance sensor is covered by the user's hand. The portable electronic device may adjust the brightness of the display to be dark by performing the hysteresis adjustment operation of the illuminance sensor is covered by the user's hand, and this may inconvenience the user.

The portable electronic device may maintain a low display brightness in a backlight state in which the direction of the illuminance sensor (i.e., the direction in which the illuminance sensor receives light) is opposite to the direction of sunlight (or lighting), and this operation may be inappropriate to the peripheral environment (e.g., peripheral brightness) of the electronic device.

Aspects of the disclosure are to address at least the above-mentioned problems and/or disadvantages and to provide at least the advantages described below. Accordingly, an aspect of the disclosure is to provide an electronic device and a method wherein the state of the electronic device is determined by using multiple illuminance sensors and at least one motion sensor, and the brightness of a display is automatically adjusted based on the determined state of the electronic device, thereby improving user convenience.

Another aspect of the disclosure is to provide an electronic device and a method wherein multiple illuminance sensors are used to determine whether it is currently a backlight state, and the brightness of a display is automatically adjusted so as to correspond to the backlight state, thereby improving user convenience.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a display disposed in a first direction of the housing, a first illuminance sensor disposed in the first direction of the housing, a second illuminance sensor disposed in a second direction of the housing opposite to the first direction, a memory disposed in an inner space of the housing, and a processor disposed in the inner space of the housing, wherein the processor is configured to configure a brightness of the display to a first brightness, based on a first front-surface sensing value detected through the first illuminance sensor, acquire a second front-surface sensing value smaller than the first front-surface sensing value through the first illuminance sensor while the brightness of the display is the first brightness, compare the second front-surface sensing value with a first rear-surface sensing value detected through the second illuminance sensor, in case that the second front-surface sensing value is greater than or equal to the first rear-surface sensing value, determine whether a touch input is detected through a designated region of the display, maintain the brightness of the display at the first brightness in case that the touch input is detected, and in case that the touch input is not detected, adjust the brightness of the display to a value lower than that of the first brightness, based on a first lookup table (LUT) stored in the memory, or maintain the brightness of the display at the first brightness.

In accordance with another aspect of the disclosure, a method of an electronic device is provided. The method includes configuring the brightness of a display to first brightness, based on a first front-surface sensing value detected through a first illuminance sensor disposed in a first direction of a housing, acquiring a second front-surface sensing value smaller than the first front-surface sensing value through the first illuminance sensor while the brightness of the display is the first brightness, comparing the second front-surface sensing value with a first rear-surface sensing value detected through a second illuminance sensor disposed in a second direction of the housing, the second direction being opposite to the first direction, in case that the second front-surface sensing value is greater than or equal to the first rear-surface sensing value, determining whether a touch input is detected through a designated region of the display, maintaining the brightness of the display at the first brightness in case that the touch input is detected, and in case the touch input is not detected, adjusting the brightness of the display to a value lower than that of the first brightness, based on a first lookup table (LUT) stored in a memory, or maintaining the brightness of the display at the first brightness.

An electronic device and a method according to various embodiments of the disclosure may determine the state of the electronic device by using multiple illuminance sensors and at least one motion sensor, and may automatically adjust the brightness of a display based on the determined state of the electronic device, thereby improving user convenience.

An electronic device and a method according to various embodiments of the disclosure may determine whether it is currently a backlight state by using multiple illuminance sensors, and may automatically adjust the brightness of a display so as to correspond to the backlight state, thereby improving user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
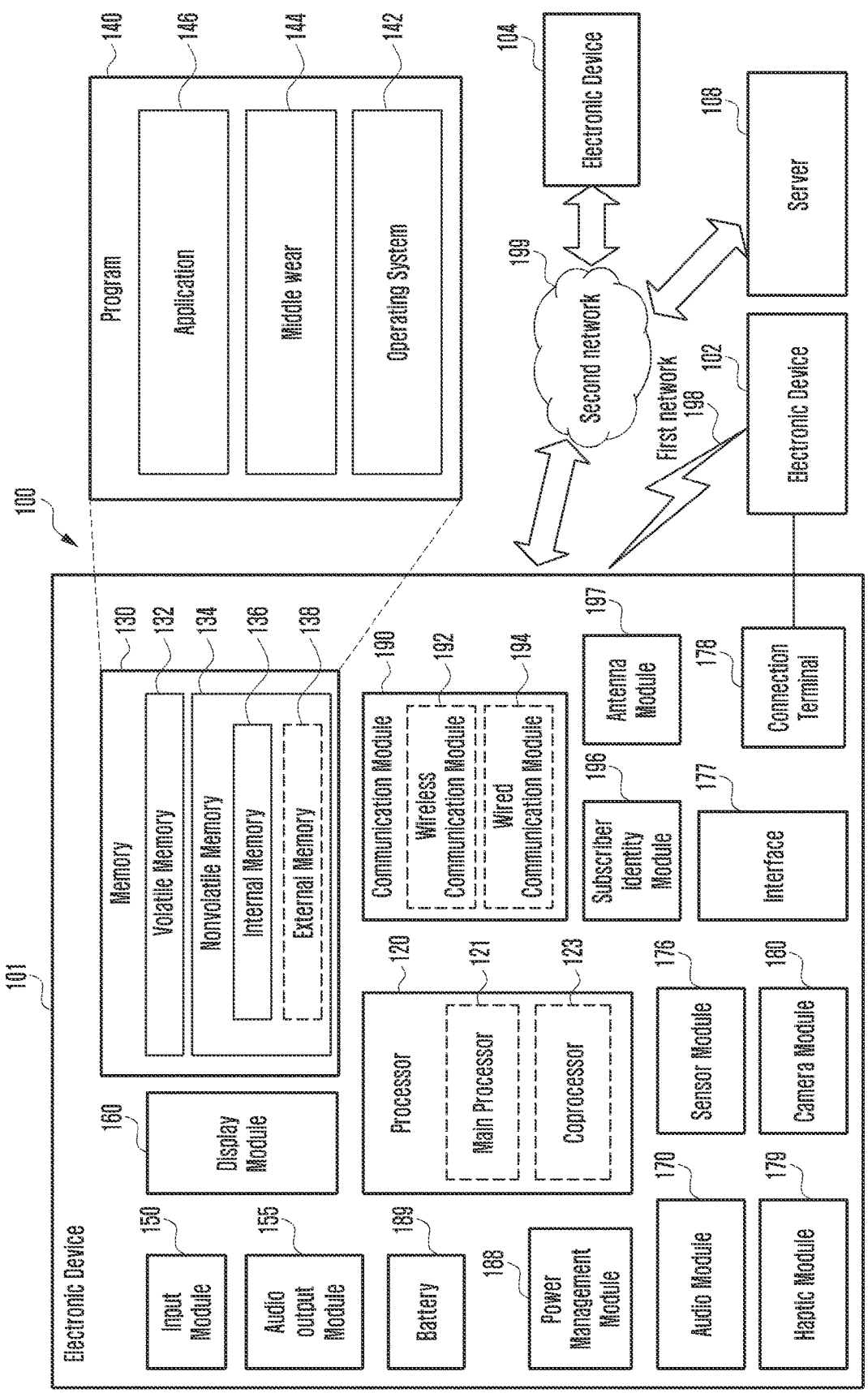
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabit(s) per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device (i.e., electronic device 104) via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (i.e., electronic device 102 or 104, or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device (i.e., electronic device 104) may include an internet-of-things (IoT) device. The server 108 may be an intelligent server using machine learning and/or a neural network. According to an embodiment, the external electronic device (i.e., electronic device 104) or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) according to various embodiments may include housings (e.g., a pair of housings 210 and 220 of FIG. 2), a display (e.g., the display 620 of FIG. 6) disposed in a first direction of the housings 210 and 220, a first illuminance sensor (e.g., the first illuminance sensor 631 of FIG. 6) disposed in the first direction of the housings 210 and 220, a second illuminance sensor (e.g., the second illuminance sensor 632 of FIG. 6) disposed in a second direction of the housings 210 and 220 opposite to the first direction, a memory (e.g., the memory 130 of FIG. 1) disposed in the inner space of the housings 210 and 220, and a processor (e.g., the processor 120 of FIG. 1) disposed in the inner space of the housings 210 and 220, and the processor 120 may configure the brightness of the display 620 to first brightness, based on a first front-surface sensing value detected through the first illuminance sensor 631, acquire a second front-surface sensing value smaller than the first front-surface sensing value through the first illuminance sensor 631 while the brightness of the display 620 is the first brightness, compare the second front-surface sensing value with a first rear-surface sensing value detected through the second illuminance sensor 632, determine, in case that the second front-surface sensing value is greater than or equal to the first rear-surface sensing value, whether a touch input is detected through a designated region of the display 620, maintain the brightness of the display 620 at the first brightness in case that the touch input is detected, and in case that the touch input is not detected, adjust the brightness of the display 620 to a value lower than that of the first brightness, based on a first LUT 611 (Table 1) (lookup table) stored in the memory 130, or maintain the brightness of the display 620 at the first brightness.

According to one embodiment, the designated region may correspond to at least a portion of the display 620 positioned within a designated distance from the first illuminance sensor 631.

According to one embodiment, the first LUT 611 (Table 1) may include a plurality of first down hysteresis values mapped to a plurality of illuminance values, and the processor 120 may compare, in case the touch input is not detected, the second front-surface sensing value with a first down hysteresis value, mapped to the first brightness, among the plurality of first down hysteresis values, maintain the brightness of the display 620 at the first brightness in case that the second front-surface sensing value is greater than the first down hysteresis value mapped to the first brightness, and change the brightness of the display 620 to a second specified brightness, which is lower than the first brightness, in case that the second front-surface sensing value is less than or equal to the first down hysteresis value mapped to the first brightness.

According to one embodiment, in case that the second front-surface sensing value is smaller than the first rear-surface sensing value, the processor 120 may store the first front-surface sensing value and the first rear-surface sensing value in the memory 130, configure the first front-surface sensing value as a first variable (V1), configure the first rear-surface sensing value as a second variable (V2), determine using a motion sensor 640 whether the direction of the display 620 is at an acute angle with respect to the direction of gravity, and in case that the direction of the display 620 is at an acute angle with respect to the direction of gravity, adjust the brightness of the display 620 to a value lower than that of the first brightness, based on the second variable (V2) and the first LUT 611 (Table 1) (lookup table), or maintain the brightness of the display 620 at the first brightness.

According to one embodiment, in case that the direction of the display 620 is not at an acute angle with respect to the direction of gravity, the processor 120 may determine whether the first variable (V1) and the second variable (V2) satisfy a specified condition, and the determining by the processor 120 whether the specified condition is satisfied may include determining that a first specified condition is satisfied, in case that the second variable (V2) is greater than a first reference value and the ratio of the first variable (V1) to the second variable (V2) is less than or equal to a second reference value, and determining that a second specified condition is satisfied, in case the second variable (V2) is less than or equal to the first reference value or the ratio of the first variable (V1) to the second variable (V2) is greater than the second reference value.

According to one embodiment, in case that the first variable (V1) and the second variable (V2) satisfy the first condition, the processor 120 may configure a third variable (V3) by applying a specified weight to the second variable (V2), update the third variable (V3) by selecting a smaller value among the first variable (V1) and the third variable (V3), and maintain the brightness of the display 620 at the first brightness or adjust the brightness of the display 620 to a value lower than that of the first brightness, based on the third variable (V3) and a second LUT 612 (Table 2) stored in the memory 130.

According to one embodiment, the second LUT 612 (Table 2) may include a plurality of second down hysteresis values mapped to a plurality of illuminance values such that the plurality of second down hysteresis values are smaller than the first down hysteresis values included in the first LUT 611 (Table 1), and the in case the first variable (V1) and the second variable (V2) satisfy the first condition, the processor 120 may compare the third variable (V3) with a second down hysteresis value, mapped to the first brightness, among the plurality of second down hysteresis values, maintain the brightness of the display 620 at the first brightness in case that the third variable (V3) is greater than the second down hysteresis value mapped to the first brightness, and change the brightness of the display 620 to a third specified brightness, which is lower than the first brightness, in case that the third variable (V3) is less than or equal to the second down hysteresis value mapped to the first brightness.

According to one embodiment, in case that the first variable (V1) and the second variable (V2) satisfy the second condition, the processor 120 may configure a third variable (V3) by applying a specified weight to the second variable (V2), update the third variable (V3) by selecting a smaller value among the first variable (V1) and the third variable (V3), and maintain the brightness of the display 620 at the first brightness or adjust the brightness of the display 620 to a value lower than that of the first brightness, based on the third variable (V3) and a third LUT 612 (Table 3) stored in the memory 130.

According to one embodiment, the third LUT 612 (Table 3) may include a plurality of third down hysteresis values mapped to a plurality of illuminance values such that the plurality of third down hysteresis values are smaller than the plurality of second down hysteresis values in the second LUT 612 (Table 2) stored in the memory 130, and in case that the first variable (V1) and the second variable (V2) satisfy the second condition, the processor 120 may maintain the brightness of the display 620 at the first brightness in case that the third variable (V3) is greater than 0 lux, and change the brightness of the display 620 to a fourth specified brightness, which is lower than the first brightness, in case that the third variable (V3) is 0 lux.

According to one embodiment, the processor 120 may compare, while the brightness of the display 620 is the first brightness and the first front-surface sensing value is maintained through the first illuminance sensor 631, the first front-surface sensing value with a second rear-surface sensing value detected through the second illuminance sensor 632, and adjust the brightness of the display 620, based on wake-up illuminance included in the first LUT 611 (Table 1), in case that the second rear-surface sensing value is greater than or equal to the first front-surface sensing value.

A method of the electronic device 101 according to various embodiments may include configuring the brightness of the display 620 to first brightness, based on a first front-surface sensing value detected through the first illuminance sensor 631 disposed in a first direction of the housings 210 and 220, acquiring a second front-surface sensing value smaller than the first front-surface sensing value through the first illuminance sensor 631 while the brightness of the display 620 is the first brightness, comparing the first rear-surface sensing value detected through the second illuminance sensor 632 disposed in a second direction of the housings 210 and 220 with the second front-surface sensing value, the second direction being opposite to the first direction, determining whether a touch input is detected through a designated region of the display 620 in case that the second front-surface sensing value is greater than or equal to the first rear-surface sensing value, maintaining the brightness of the display 620 at the first brightness in case that the touch input is detected, and in case the touch input is not detected, adjusting the brightness of the display 620 to a value lower than that of the first brightness, based on a first LUT 611 (Table 1) (lookup table) stored in the memory 130, or maintaining the brightness of the display 620 at the first brightness.

According to one embodiment, the designated region may be at least a portion of the display 620 positioned within a designated distance from the first illuminance sensor 631.

According to one embodiment, the first LUT 611 (Table 1) may include a plurality of first down hysteresis values mapped to a plurality of illuminance values, and the method may further include comparing the second front-surface sensing value with a first down hysteresis value, mapped to the first brightness, among the plurality of first down hysteresis values in case that the touch input is not detected, maintaining the brightness of the display 620 at the first brightness in case that the second front-surface sensing value is greater than the first down hysteresis value mapped to the first brightness, and changing the brightness of the display 620 to a second specified brightness, which is lower than the first brightness, in case that the second front-surface sensing value is less than or equal to the first down hysteresis value mapped to the first brightness.

According to one embodiment, based on confirmation that the second front-surface sensing value is smaller than the first rear-surface sensing value, the method may further include storing the first front-surface sensing value and the first rear-surface sensing value in the memory 130, configuring the first front-surface sensing value as a first variable (V1), configuring the first rear-surface sensing value as a second variable (V2), determining using the motion sensor 640 whether the direction of the display 620 is at an acute angle with respect to the direction of gravity, and in case that the direction of the display 620 is at an acute angle with respect to the direction of gravity, adjusting the brightness of the display 620 to a value lower than that of the first brightness, based on the second variable (V2) and the first LUT 611 (Table 1), or maintaining the brightness of the display 620 at the first brightness.

According to one embodiment, the method may further include, in case that the direction of the display 620 is not at an acute angle with respect to the direction of gravity, determining whether the first variable (V1) and the second variable (V2) satisfy a specified condition, and the determining whether the specified condition is satisfied may include determining that a first specified condition is satisfied in case that the second variable (V2) is greater than a first reference value and a ratio of the first variable (V1) to the second variable (V2) is less than or equal to a second reference value, and determining that a second specified condition is satisfied in case that the second variable (V2) is less than or equal to the first reference value or the ratio of the first variable (V1) to the second variable (V2) is greater than the second reference value.

According to one embodiment, based on confirmation that the first variable (V1) and the second variable (V2) satisfy the first condition, the method may include configuring a third variable (V3) by applying a specified weight to the second variable (V2), updating the third variable (V3) by selecting a smaller value among the first variable (V1) and the third variable (V3), and maintaining the brightness of the display 620 at the first brightness or adjusting the brightness of the display 620 to a value, which is lower than the first brightness, based on the third variable (V3) and the second LUT 612 (Table 2) stored in the memory 130.

According to one embodiment, the second LUT 612 (Table 2) may include a plurality of second down hysteresis values mapped to a plurality of illuminance values such that the plurality of second down hysteresis values are smaller than the plurality of first down hysteresis values included in the first LUT 611 (Table 1), and based on confirmation that the first variable (V1) and the second variable (V2) satisfy the first condition, the method may further include comparing the third variable (V3) with a second down hysteresis value, mapped to the first brightness, among the plurality of second down hysteresis values; maintaining the brightness of the display 620 at the first brightness in case that the third variable (V3) is greater than the second down hysteresis value mapped to the first brightness, and changing the brightness of the display 620 to a third specified brightness, which is lower than the first brightness, in case that the third variable (V3) is less than or equal to the second down hysteresis value mapped to the first brightness.

According to one embodiment, based on confirmation that the first variable (V1) and the second variable (V2) satisfy the second condition, the method may further include configuring a third variable (V3) by applying a specified weight to the second variable (V2), updating the third variable (V3) by selecting a smaller value among the first variable (V1) and the third variable (V3); and maintaining the brightness of the display 620 at the first brightness or adjusting the brightness of the display 620 to a value lower than that of the first brightness, based on the third variable (V3) and the third LUT 612 (Table 3) stored in the memory 130.

According to one embodiment, the third LUT 612 (Table 3) may include a plurality of third down hysteresis values mapped to a plurality of illuminance values such that the plurality of third down hysteresis values are smaller than the plurality of second down hysteresis values of the second LUT 612 (Table 2) stored in the memory 130, and based on confirmation that the first variable (V1) and the second variable (V2) satisfy the second condition, the method may further include maintaining the brightness of the display 620 at the first brightness in case that the third variable (V3) is greater than 0 lux, and changing the brightness of the display 620 to a fourth specified brightness, which is lower than the first brightness, in case that the third variable (V3) is 0 lux.

According to one embodiment, the method may further include comparing a second rear-surface sensing value detected through the second illuminance sensor 632 with the first front-surface sensing value while the brightness of the display 620 is the first brightness and the first front-surface sensing value is maintained through the first illuminance sensor 631, and adjusting the brightness of the display 620, based on the wake-up illuminance included in the first LUT 611 (Table 1) in case that the second rear-surface sensing value is greater than or equal to the first front-surface sensing value.

Figure 2:
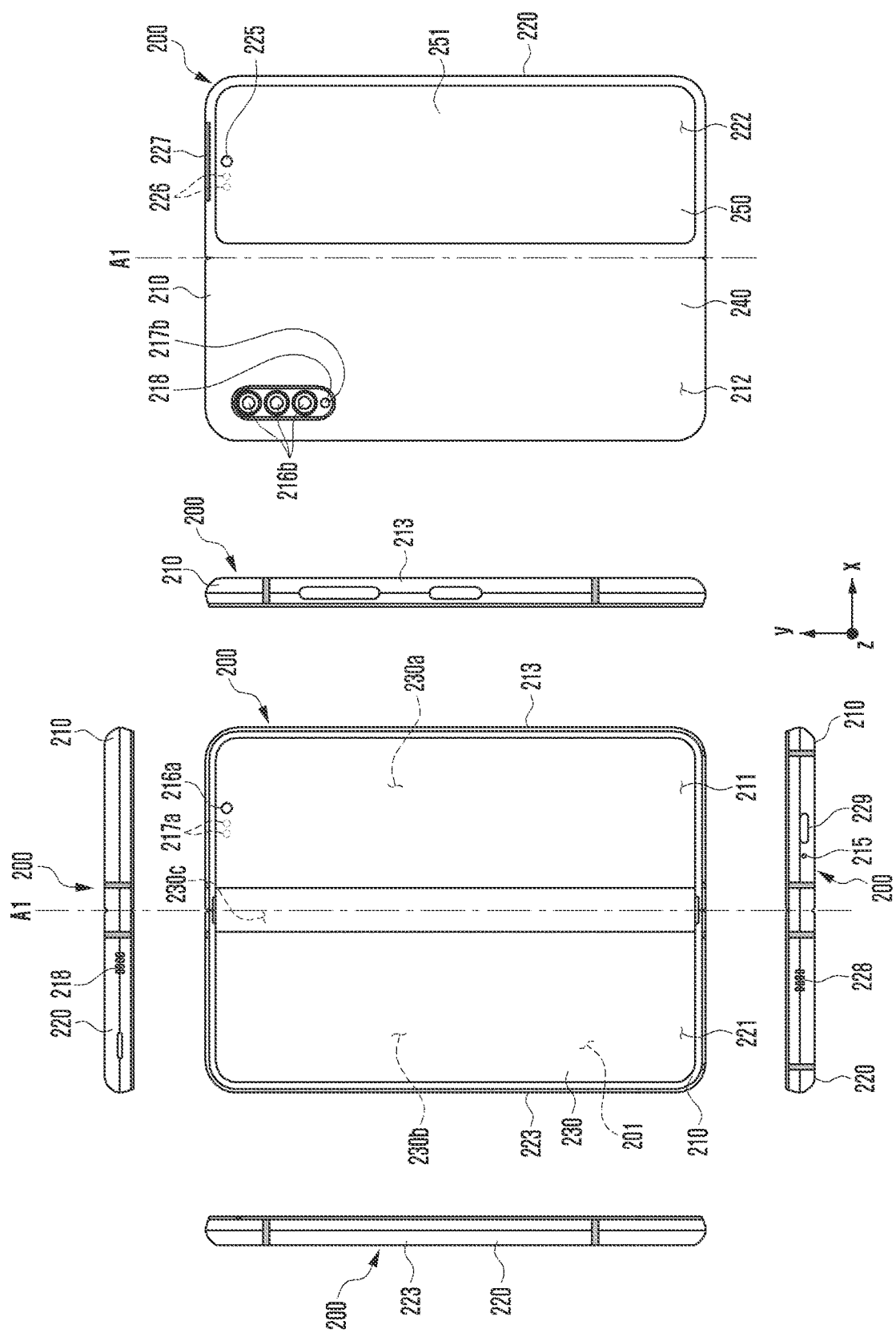
FIG. 2 illustrates an unfolded stage of an electronic device according to an embodiment of the disclosure.

FIG. 2 illustrates an unfolded stage of an electronic device according to an embodiment of the disclosure.

Figure 3:
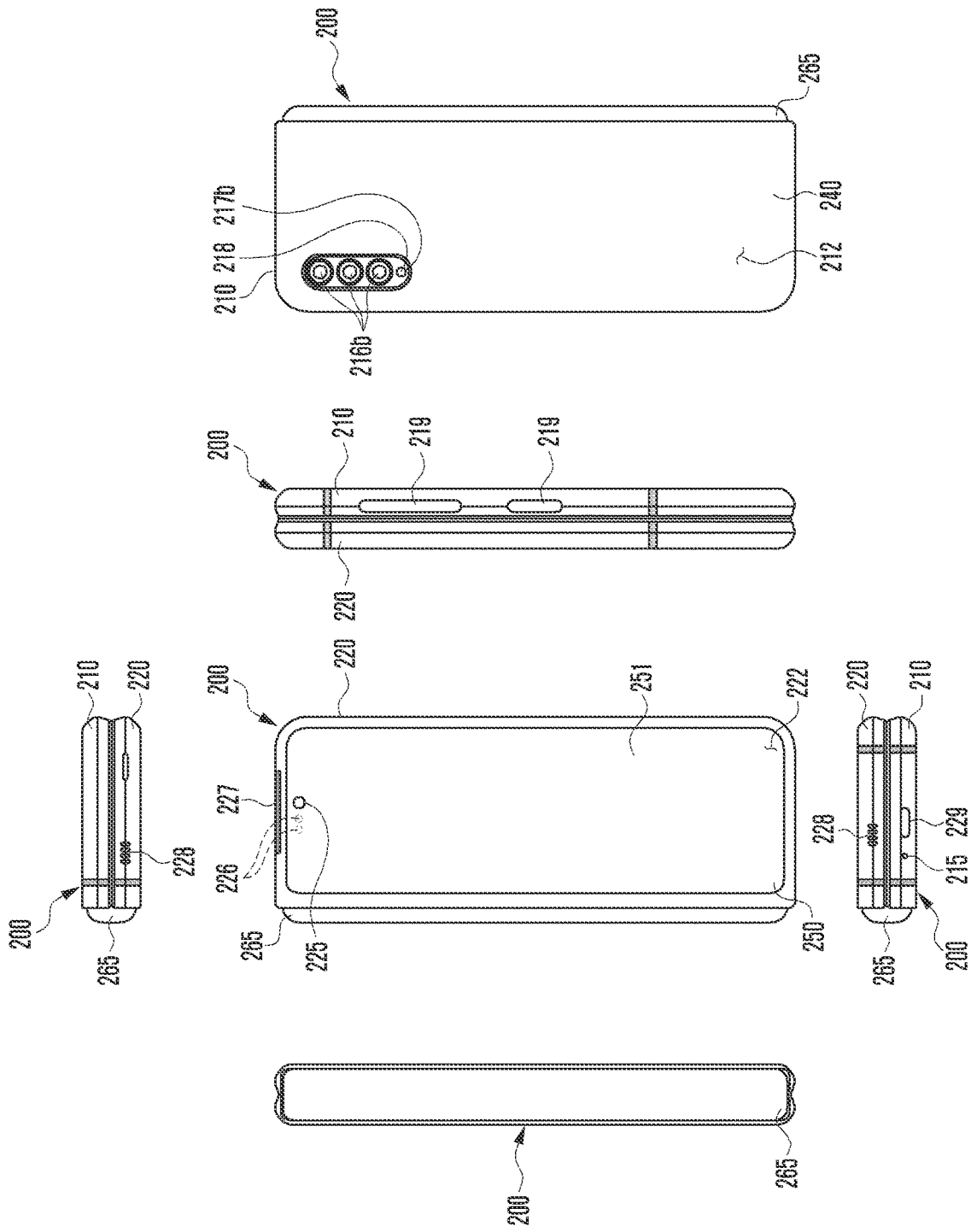
FIG. 3 illustrates a folded state of the electronic device of FIG. 2 according to an embodiment of the disclosure.

FIG. 3 illustrates a folded state of the electronic device of FIG. 2 according to an embodiment of the disclosure.

Referring to FIGS. 2 and 3, the electronic device 200 may include a pair of housings 210 and 220 rotatably coupled with respect to a folding axis (A1) through a hinge module to be folded with respect to each other (e.g., a foldable housing), a first display 230 (e.g., a flexible display, a foldable display, or a main display) disposed through the pair of housings 210 and 220, and a second display 251 (e.g., a sub-display). According to one embodiment, in a folded state, the hinge module may be disposed to be invisible from the outside through the first housing 210 and the second housing 220, and in an unfolded state, the hinge module may be disposed to be invisible from the outside through a hinge cover 265 which protects the hinge module and covers a foldable portion. In the disclosure, the surface on which the first display 230 is disposed may be defined as a front surface of the electronic device 200, and the opposite surface of the front surface may be defined as a rear surface of the electronic device 200. In addition, the surface surrounding a space between the front surface and the rear surface may be defined as a side surface of the electronic device 200.

According to various embodiments, the pair of housings 210 and 220 may include a first housing 210 and a second housing 220 which are disposed to be foldable with respect to each other through a hinge module. According to one embodiment, the pair of housings 210 and 220 are not limited to the shape and combination shown in FIGS. 2 and 3, and may be implemented by other shapes or a combination and/or union of components. According to one embodiment, the first housing 210 and the second housing 220 may be disposed on opposite sides with the folding axis (A1) as the center interposed therebetween, and may have an overall symmetrical shape with respect to the folding axis (A1). According to another embodiment, the first housing 210 and the second housing 220 may be folded asymmetrically with respect to the folding axis (A1). According to one embodiment, according to whether the electronic device 200 is in an unfolded stat (e.g., a first state), in a folded state (e.g., a second state), or an intermediate state (e.g., a third state), the first housing 210 and the second housing 220 may have different angles or distances formed from each other.

According to various embodiments, the first housing 210 may be connected to the hinge module in an unfolded state of the electronic device 200, and may include a first surface 211 and a first surface 211 disposed to face the front surface of the electronic device 200 and a second surface 212 facing opposite to the first surface 211, and a first side member 213 surrounding at least a portion of a first space between the first surface 211 and the second surface 212. According to one embodiment, the second housing 220 may be connected to the hinge module in an unfolded state of the electronic device 200, and may include a third surface 221 disposed to face the front surface of the electronic device 200, a fourth surface 222 facing opposite to the third surface 221, and a second side member 223 surrounding at least a portion of a second space between the third surface 221 and the fourth surface 222. According to one embodiment, the first surface 211 may face in the same direction as the third surface 221 in the unfolded state and face the third surface 221 in the folded state. According to one embodiment, the electronic device 200 may include a recess 201 formed to accommodate a first display 230 through structural coupling between the first housing 210 and the second housing 220. According to one embodiment, the recess 201 may have substantially the same size as the first display 230.

According to various embodiments, the hinge cover 265 may be disposed between the first housing 210 and the second housing 220 to cover the hinge module. According to one embodiment, the hinge cover 265 may be covered by a portion of the first housing 210 and the second housing 220 or may be exposed to the outside according to an unfolded state, a folded state, or an intermediate state of the electronic device 200. For example, in case that the electronic device 200 is in an unfolded state, the hinge cover 265 is covered by the first housing 210 and the second housing 220 and thus not exposed. According to one embodiment, in case that the electronic device 200 is in a folded state, the hinge cover 265 may be exposed to the outside while being disposed between the first housing 210 and the second housing 220. According to one embodiment, in case that the first housing 210 and the second housing 220 are in an intermediate state where the same are folded with a certain angle, the hinge cover 265 may be at least partially exposed to the outside of the electronic device 200 while being disposed between the first housing 210 and the second housing 220. For example, the region of the hinge cover 265 exposed to the outside may be smaller than that in a fully folded state. According to one embodiment, the hinge cover 265 may include a curved surface.

According to various embodiments, in case that the electronic device 200 is in an unfolded state (e.g., the state of FIG. 2), the first housing 210 and the second housing 220 may form an angle of about 180 degrees, and a first region 230a, a folding region 230c, and a second region 230b of the first display 230 may form the same plane and may be disposed to face the same direction. In another embodiment, in case that the electronic device 200 is in an unfolded state, the first housing 210 may rotate at an angle of 360 degrees with respect to the second housing 220 to be folded oppositely (out-folding method) such that the second surface 212 and the fourth surface 222 face each other.

According to various embodiments, in case that the electronic device 200 is in a folded state (e.g., the state of FIG. 3), the first surface 211 of the first housing 210 and the third surface 221 of the second housing 220 may be disposed to face each other. In this case, the first region 230a and the second region 230b of the first display 230 may be disposed to form a narrow angle (e.g., a range from 0 degree to about 10 degree) with each other through the folding region 230c and may be arranged to face each other. According to one embodiment, at least a portion of the folding region 230c may have a curved surface having a predetermined radius of curvature. According to one embodiment, in case that the electronic device 200 is in an intermediate state, the first housing 210 and the second housing 220 may be disposed at a certain angle with respect to each other. In this case, the first region 230a and the second region 230b of the first display 230 may form an angle larger than that in the folded state and smaller than that in the unfolded state, and the radius of curvature of the folding region 230c may be larger than that in the folded state. In yet another embodiment, the first housing 210 and the second housing 220 may form an angle at which the same can be stopped at a specified folding angle formed between the folded state and the unfolded state through the hinge module (free stop function). In yet another embodiment, the first housing 210 and the second housing 220 may operate while being pressed through the hinge module in the unfolding or folding direction, based on a designated inflection angle.

According to various embodiments, the electronic device 200 may include at least one of one or more displays 230 and 251 disposed in the first housing 210 and/or the second housing 220, an input device 215, audio output devices 227 and 228, sensor modules 217a, 217b, and 226, camera devices 216a, 216b, and 225, a key input device 219, an indicator (not shown), or a connector port 229. In yet another embodiment, at least one of the elements may be omitted from the electronic device 200 or another element may be added thereto.

According to various embodiments, the one or more displays 230 and 251 may include a first display 230 (e.g., a flexible display) disposed to be supported by the third surface 221 of the second housing 220 through a hinge module from the first surface 211 of the first housing 210, and a second display 251 disposed to be visible from the outside through the fourth surface 222 while being disposed in the inner space of the second housing 220. According to one embodiment, the first display 230 may be mainly used in the unfolded state of the electronic device 200, and the second display 251 may be mainly used in the folded state of the electronic device 200. According to one embodiment, in case that the electronic device 200 is in the intermediate state, the first display 230 or the second display 251 may be used based on a folding angle between the first housing 210 and the second housing 220.

According to various embodiments, the first display 230 may be disposed in a space formed by the pair of housings 210 and 220. For example, the first display 230 may be stably placed in the recess 201 formed by the pair of housings 210 and 220 and may be arranged to occupy substantially a great portion of the front surface of the electronic device 200. According to one embodiment, the first display 230 may include a flexible display having at least a partial region which is deformable into a flat surface or a curved surface. According to one embodiment, the first display 230 may include a first region 230a facing the first housing 210, a second region 230b facing the second housing 220, and a folding region 230c connecting the first region 230a to the second region 230b and facing the hinge module.

According to one embodiment, the first region 230a of the first display 230 may substantially form the first surface 211 of the first housing 210. According to one embodiment, the second region 230b of the first display 230 may substantially form the third surface 221 of the second housing 220.

According to one embodiment, the region division of the first display 230 may be merely a physical division by the pair of housings 210 and 220 and the hinge module, and the first display 230 may display substantially one full seamless screen through the pair of housings 210 and 220 and the hinge module. According to one embodiment, the first region 230a and the second region 230b may have an overall symmetrical shape or a partially asymmetrical shape with respect to the folding region 230c.

Although not shown, according to various embodiments, the electronic device 200 may include a plurality of hinge modules and/or a plurality of folding regions 230c. For example, the electronic device 200 includes two hinge modules and two folding regions (not shown) corresponding to the two hinge modules (not shown), respectively. In this case, the electronic device 200 may be folded in the shape of the alphabet Z. For example, the electronic device 200 includes three hinge modules (not shown) and three folding regions (not shown) corresponding to the three hinge modules (not shown), respectively. In this case, the electronic device 200 may be folded in the shape of the alphabet W.

According to various embodiments, the electronic device 200 may include a first rear cover 240 disposed on the second surface 212 of the first housing 210, and a second rear cover 250 disposed on the fourth surface 222 of the second housing 220. In yet another embodiment, at least a portion of the first rear cover 240 may be integrally formed with the first side member 213. In yet another embodiment, at least a portion of the second rear cover 250 may be integrally formed with the second side member 223. According to one embodiment, at least one cover of the first rear cover 240 and the second rear cover 250 may be formed through a substantially transparent plate (e.g., a glass plate including various coating layers, or a polymer plate) or an opaque plate. According to one embodiment, the first rear cover 240 may be formed by, for example, an opaque plate, such as coated or tinted glass, ceramic, polymer, metal (e.g., aluminum, stainless steel (STS), or magnesium), or a combination of at least two of the foregoing materials. According to one embodiment, the second rear cover 250 may be formed through a substantially transparent plate, such as glass or polymer. Accordingly, the second display 251 may be disposed to be visible from the outside through the second rear cover 250 while being disposed in the inner space of the second housing 220.

According to various embodiments, the input device 215 may include a microphone 215. In yet another embodiment, the input device 215 may include a plurality of microphones 215 arranged to detect the direction of sound. According to one embodiment, the audio output devices 227 and 228 may include speakers 227 and 228. According to one embodiment, the speakers 227 and 228 may include a call receiver (i.e., speaker 227) disposed through the fourth surface 222 of the second housing 220, and an external speaker 228 disposed through the side member of the second housing 220. In yet another embodiment, the microphone 215, speakers 227 and 228, and connector port 229 may be disposed in spaces of the first housing 210 and/or the second housing 220 and may be exposed to the external environment through at least one hole formed through the first housing 210 and/or the second housing 220. In yet another embodiment, the holes formed through the first housing 210 and/or the second housing 220 may be used for both the microphone 215 and the speakers 227 and 228. In yet another embodiment, the audio output devices 227 and 228 may also include a speaker (e.g., a piezo speaker) that operates without the holes formed through the first housing 210 and/or the second housing 220.

According to various embodiments, the camera devices 216a, 216b, and 225 may include a first camera device 216a disposed on the first surface 211 of the first housing 210, a second camera device 216b disposed on the second surface 212 of the first housing 210, and/or a third camera device 225 disposed on the fourth surface 222 of the second housing 220. According to one embodiment, the electronic device 200 may include a flash 218 disposed near the second camera device 216b. According to one embodiment, the flash 218 may include, for example, a light emitting diode or a xenon lamp. According to one embodiment, the camera devices 216a, 216b, and 225 may include one or more lenses, an image sensor, and/or an image signal processor. In yet another embodiment, at least one of the camera devices 216a, 216b, and 225 may include two or more lenses (wide angle and telephoto lenses) and image sensors, and may be disposed together on either surface of the first housing 210 and/or the second housing 220.

According to various embodiments, the sensor modules 217a, 217b, and 226 may generate an electrical signal or a data value corresponding to an internal operating state of the electronic device 200 or an external environmental state. According to one embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In yet another embodiment, the sensor modules 217a, 217b, and 226 may include at least one of a gesture sensor, a grip sensor, a color sensor, an infrared (IR) sensor, an illumination sensor, an ultrasonic sensor, an iris recognition sensor, or a distance detection sensor (time-of-flight (TOF) sensor or RiDAR scanner).

According to various embodiments, the electronic device 200 may further include a sensor module which is not shown, for example, at least one of a barometric pressure sensor, a magnetic sensor, a biometric sensor, a temperature sensor, a humidity sensor, or a fingerprint recognition sensor. In yet another embodiment, the fingerprint recognition sensor may be disposed through at least one side member of the first side member 213 of the first housing 210 and/or the second side member 223 of the second housing 220.

According to various embodiments, the key input device 219 may be disposed to be exposed to the outside through the first side member 213 of the first housing 210. In yet another embodiment, the key input device 219 may be disposed to be exposed to the outside through the second side member 223 of the second housing 220. In yet another embodiment, the electronic device 200 may not include some or all of the above-mentioned key input devices 219, and the key input device 219 which is not included therein may be implemented in another form such as a soft key on the one or more displays 230 and 251. As yet another embodiment, the key input device 219 may be implemented using a pressure sensor included in the one or more displays 230 and 251.

According to various embodiments, the connector port 229 may accommodate a connector (e.g., a USB connector or an interface connector port module (IF module)) for transmitting and receiving power and/or data to and from an external electronic device. In yet another embodiment, the connector port 229 may further include a separate connector port (e.g., an ear jack hole) for performing a function for transmitting and receiving an audio signal to and from an external electronic device together or for performing a function for transmitting and receiving an audio signal.

According to various embodiments, one or more camera devices 216a and 225 of the camera devices 216a, 216b, and 225, one or more sensor modules 217a and 226 of the sensor modules 217a, 217b, and 226, and/or the indicator may be arranged to be visually exposed through the one or more displays 230 and 251. For example, the one or more camera devices 216a and 225, the one or more sensor modules 217a and 226, and/or the indicator are arranged in the inner space of the one or more housings 210 and 220 to be disposed in an activate area of the displays 230 and 251, and are arranged to be in contact with the external environment through an opening formed by perforating the cover member (e.g., a window layer (not shown) of the first display 230 and/or the second rear cover 250). In yet another embodiment, specific camera devices or sensor modules may be arranged to perform functions thereof without being visually exposed through the display. For example, a region of the display 230 (e.g., a display panel) facing the camera device and/or the sensor module does not require a perforated opening.

Figure 4:
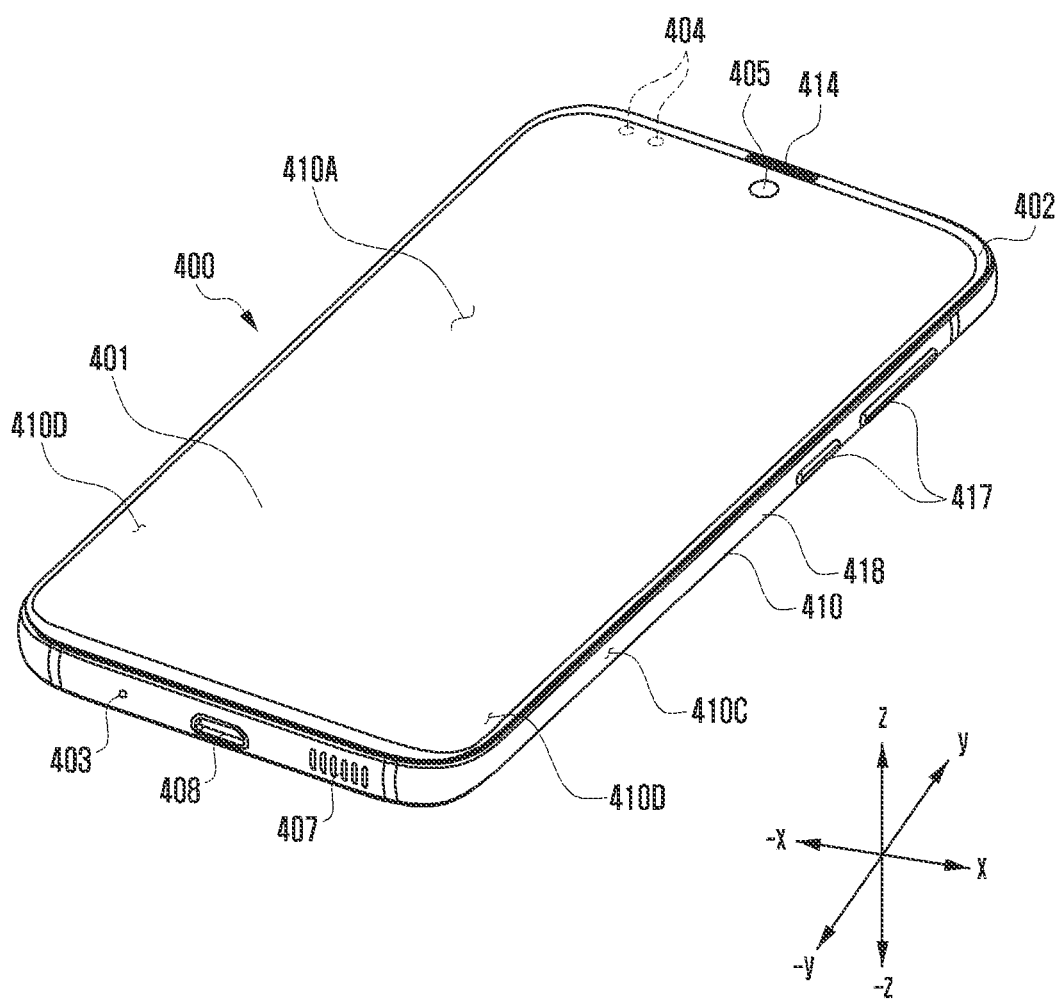
FIG. 4 is a perspective view of a front surface of an electronic device according to an embodiment of the disclosure.

FIG. 4 is a perspective view of the front surface of an electronic device (e.g., a mobile electronic device) according to an embodiment of the disclosure.

Figure 5:
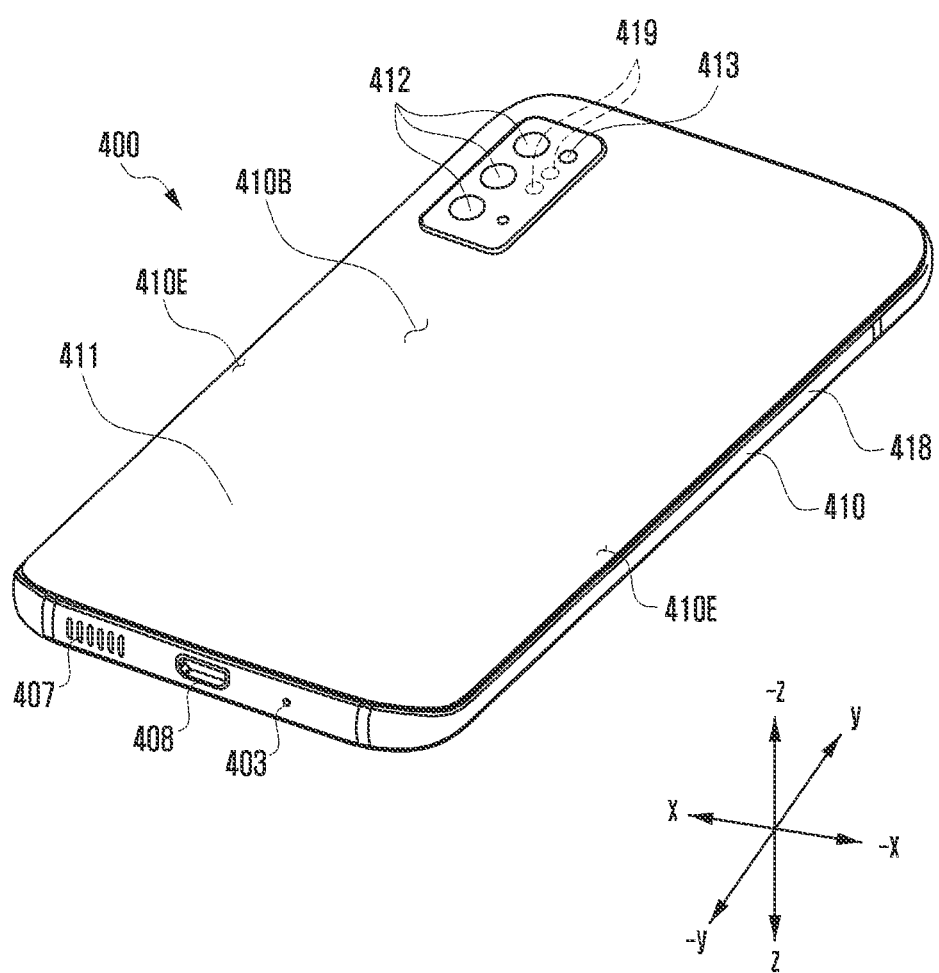
FIG. 5 is a perspective view of a rear surface of an electronic device according to an embodiment of the disclosure.

FIG. 5 is a perspective view of the rear surface of an electronic device according to an embodiment of the disclosure.

Referring to FIGS. 4 and 5, an electronic device 400 according to one embodiment may include a housing 410 including a first surface 310A (or a front surface), a second surface 310B (or a rear surface), and a side surface 410C surrounding a space between the first surface 410A and the second surface 410B. In another embodiment (not shown), a structure configuring a part of the first surface 410A, the second surface 410B, and the side surfaces 410C may be referred to as a housing. According to one embodiment, the first surface 410A may be formed by a front plate 402 (e.g., a polymer plate or a glass plate including various coating layers) having at least a portion which is substantially transparent. The second surface 410B may be formed by a rear plate 411 which is substantially opaque. The rear plate 411 may be formed by, for example, coated or colored glass, ceramic, a polymer, a metal (e.g., aluminum, stainless steel (STS), or magnesium), or a combination of at least two thereof. The side surface 410C may be formed by a side bezel structure 418 (or a "side surface member") that is coupled to the front plate 402 and the rear plate 411 and includes a metal and/or a polymer. In an embodiment, the rear plate 411 and side bezel structure 418 may be integrally formed and include the same material (e.g., a metal material such as aluminum).

In the illustrated embodiment, the front plate 402 may include first regions 410D, which are arranged at ends of opposite longer edges of the front surface plate, respectively, and are curved and seamlessly extend from the first surface 410A toward the rear plate. In one embodiment, the rear plate 411 may include second regions 410E arranged at ends of opposite longer edges thereof, respectively, and curved and seamlessly extending from the second surface 410B toward the front plate. In another embodiment, the front plate 402 or the rear plate 411 may include only one of the first regions 410D or the second regions 410E. In yet another embodiment, the front plate 402 may not include the first regions or the second regions and may include only a flat plane disposed parallel to the second surface 410B. In the above embodiments, when the electronic device is viewed from the side, the side bezel structure 418 may have a first thickness (or width) on a side surface including no first regions 410D or second regions 410E, and may have a second thickness thinner than the first thickness on a side surface including the first region 410D or the second regions 410E.

According to one embodiment, the electronic device 400 may include at least one of a display 401, an input device 403, audio output devices 407 and 414, sensor modules 404 and 419, camera modules 405 and 412, a key input device 417, an indicator (not shown), and a connector 408. In yet another embodiment, at least one (e.g., the key input devices 417 or the indicator) of the elements may be omitted from the electronic device 400 or another element may be added to the electronic device 400.

The display 401 may be visually exposed, for example, through a significant portion of the front plate 402. In yet another embodiment, at least a portion of the display 401 may be exposed through the front plate 402 forming the first surface 410A and the first regions 410D of the side surface 410C. The display 401 may be coupled to or disposed adjacent to a touch sensing circuit, a pressure sensor capable of measuring the intensity (pressure) of a touch, and/or a digitizer that detects a magnetic field type stylus pen. In yet another embodiment, at least a portion of the sensor modules 404 and 419 and/or at least a portion of the key input device 417 may be placed in the first region 410D and/or the second region 410E.

The input device 403 may include a microphone 403. In yet another embodiment, the input device 403 may include a plurality of microphones 403 arranged to detect the direction of sound. The audio output devices 407 and 414 may include speakers 407 and 414. The speakers 407 and 414 may include an external speaker 407 and a call receiver (i.e., speaker 414). In yet another embodiment, the microphone 403, the speakers 407 and 414, and the connector 408 may be at least partially disposed in the inner space of the electronic device 400, and may be exposed to the external environment through at least one hole formed through the housing 410. In yet another embodiment, a hole formed through the housing 410 may be used for both the microphone 403 and the speakers 407 and 414. In yet another embodiment, the audio output devices 407 and 414 may include a speaker (e.g., a piezo speaker) that operates without a hole formed through the housing 410.

The sensor modules 404 and 419 may generate an electrical signal or a data value corresponding to an internal operating state of the electronic device 400 or an external environmental state. The sensor modules 404 and 419 may be, for example, at least one of a gesture sensor, a grip sensor, a color sensor, an infrared (IR) sensor, an illuminance sensor, an ultrasonic sensor, an iris recognition sensor, a heart rate monitoring (HRM) sensor, or a distance detection sensor (a TOF sensor or a RiDAR scanner). The electronic device 400 may further include a fingerprint sensor which is not shown. The fingerprint sensor may be disposed under a first surface 410A (e.g., a home key button) of the housing 410, a partial region of a second surface 410B, and/or a display 401. The electronic device 400 may further include a sensor module which is not shown, for example, at least one of a gesture sensor, a gyro sensor, a barometric pressure sensor, a magnetic sensor, an acceleration sensor (e.g., a motion sensor), a grip sensor, a color sensor, an infrared (IR) sensor, a biometric sensor, a temperature sensor, a humidity sensor, a proximity sensor, or an illuminance sensor.

The camera modules 405 and 412 may include a first camera module 405 disposed on the first surface 410A of the electronic device 400, a second camera module 412 disposed on the second surface 410B of the electronic device 400, and/or flash 413. The camera modules 405 and 412 may include one or more lenses, an image sensor, and/or an image signal processor. The flash 413 may include, for example, a light emitting diode or a xenon lamp. In yet another embodiment, two or more lenses (a wide angle lens, an ultra-wide angle lens, or a telephoto lens) and image sensors may be disposed on one surface of the electronic device 400.

The key input device 417 may be disposed on the side surface 410C of the housing 410. In another embodiment, the electronic device 400 may not include some or all of the above-mentioned key input devices 417 and the key input device 417 which is not included therein may be implemented in another form such as a soft key on the display 401. In another embodiment, the key input device 417 may be implemented using a pressure sensor included in the display 401.

The indicator may be disposed, for example, on the first surface 410A of the housing 410. The indicator may provide, for example, state information of the electronic device 400 in the form of a light (e.g., a light emitting element). In another embodiment, the light emitting element may provide, for example, a light source that is interlocked with the operation of the camera module 405. The indicator may include, for example, a light-emitting diode (LED), an IR LED, and/or a xenon lamp.

The connector hole 408 may include a first connector hole 408 capable of accommodating a connector (e.g., a universal serial bus (USB) connector) for transmitting and receiving power and/or data to and from an external electronic device, and/or a second connector hole (or an earphone jack) (not shown) capable of accommodating a connector for transmitting and receiving an audio signal to and from an external electronic device.

Specific camera modules 405 of the camera modules 405 and 412, specific sensor modules 404 of the sensor modules 404 and 419, or an indicator may be disposed to be exposed through the display 401. For example, the camera module 405, the sensor module 404, or the indicator are arranged in the inner space of the electronic device 400 to be in contact with the external environment through a through-hole formed by perforating the front plate 402 of the display 401. In another embodiment, specific sensor modules 404 may be arranged in the inner space of the electronic device to perform functions thereof without being visually exposed through the front plate 402. For example, a partial region of the display 401 facing the specific sensor modules 404 may require a through-hole.

Figure 6:
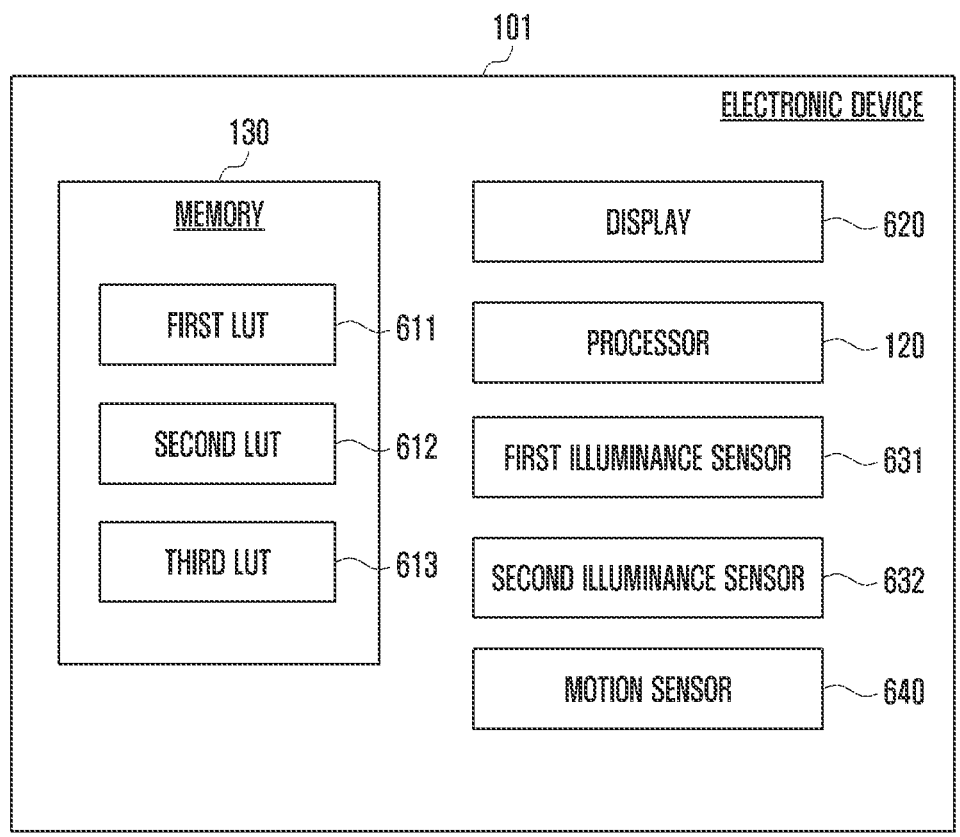
FIG. 6 is a block diagram of an electronic device according to an embodiment of the disclosure.

FIG. 6 is a block diagram of an electronic device according to an embodiment of the disclosure.

The electronic device 101 shown in FIG. 6 may be at least partially similar to the electronic device 101 shown in FIG. 1, the electronic devices 200 shown in FIGS. 2 and 3, or the electronic devices 400 shown in FIGS. 4 and 5 or may include another embodiment.

Referring to FIG. 6, the electronic device 101 according to various embodiments may include a display 620, a processor 120, a first illuminance sensor 631, a second illuminance sensor 632, a motion sensor 640, and/or a memory 130.

According to one embodiment, the display 620 may be the first display 230 or the second display 251 described with reference to FIGS. 2 and 3. According to one embodiment, the display 620 may be the display 401 described with reference to FIG. 4.

According to one embodiment, the processor 120 may dynamically adjust the brightness of the display 620, based on the front-surface sensing value acquired through the first illuminance sensor 631 and the rear-surface sensing value acquired through the second illuminance sensor 632.

According to one embodiment, the first illuminance sensor 631 may be a sensor disposed to face in substantially the same direction as the display 620. For example, in case that the display 620 is disposed in the first direction of the housing (e.g., the housings 210 and 220 of FIG. 2), the first illuminance sensor 631 is disposed to face in the first direction of the housings 210 and 220 as for the display 620. According to one embodiment, the first illuminance sensor 631 may receive light from a direction in which the display 620 faces, for example, from the first direction, and may transmit a front-surface sensing value corresponding to the received light to the processor 120.

According to one embodiment, the second illuminance sensor 632 may be a sensor disposed to face in a direction opposite to the direction of the display 620. For example, in case that the display 620 is disposed in the first direction of the housings 210 and 220, the second illuminance sensor 632 is disposed to face in the second direction of the housings 210 and 220 opposite to the direction of the display 620. According to one embodiment, the second illuminance sensor 632 may receive light from a direction opposite to the direction in which the display 620 faces, for example, from the second direction, and transmits a rear-surface sensing value corresponding to the received light to the processor 120.

The first illuminance sensor 631 and the second illuminance sensor 632 described in the disclosure may be defined as follows.

According to various embodiments, in case that the electronic device 101 includes a plurality of displays 230 and 251 as illustrated in FIGS. 2 and 3, the first illuminance sensor 631 may be a sensor disposed in the same direction as a display (e.g., the first display 230) displaying a screen among the plurality of displays 230 and 251. According to various embodiments, in case that the electronic device 101 includes a plurality of displays 230 and 251, the second illuminance sensor 632 may be a sensor disposed in a direction opposite to a display (e.g., the first display 230) displaying a screen among the plurality of displays 230 and 251.

In case that the electronic device 101 is in the unfolded state as shown in FIG. 2 and a screen is being displayed through the first display 230, the processor 120 may determine an illuminance sensor (e.g., the sensor module 217a of FIG. 2) disposed in substantially the same direction as the first display 230 as the first illuminance sensor 631 and determine an illuminance sensor (e.g., the sensor modules 226 and 217b of FIG. 2) disposed in a direction opposite to the direction of the first display 230 as the second illuminance sensor 632. In this case, the front-surface sensing value may be a sensing value acquired through the illuminance sensor (e.g., the sensor module 217a of FIG. 2) disposed in substantially the same direction as the first display 230, and the rear-surface sensing value may be a sensing value acquired through the illuminance sensor (e.g., the sensor modules 226 and 217b of FIG. 2) disposed in a direction opposite to the direction of the display 230.

In case that the electronic device 101 is in the folded state as shown in FIG. 3 and a screen is being displayed through the second display 251, the processor 120 may determine an illuminance sensor (e.g., the sensor module 226 of FIG. 3) disposed in the same direction as the second display 251 as the first illuminance sensor 631 and determine an illuminance sensor (e.g., the sensor module 217b of FIG. 3) disposed in a direction opposite to the direction of the second display 251 as the second illuminance sensor 632. In this case, the front-surface sensing value may be a sensing value acquired through the illuminance sensor (e.g., the sensor module 226 of FIG. 3) disposed in substantially the same direction as the second display 251, and the rear-surface sensing value may be a sensing value acquired through the illuminance sensor (e.g., the sensor module 217b of FIG. 3) disposed in a direction opposite to the direction of the second display 251.

According to various embodiments, in case that the electronic device 101 includes a plurality of displays 230 and 251 as illustrated in FIGS. 2 and 3, the first illuminance sensor 631 and the second illuminance sensor 632 may be determined based on a state of the electronic device 101. In case that the electronic device 101 is a foldable electronic device (e.g., the electronic device 200 of FIG. 2), the state of the electronic device 101 may include an unfolded state and/or a folded state.

In case that the electronic device 101 is in the unfolded state as shown in FIG. 2, the processor 120 may determine an illuminance sensor (e.g., the sensor module 217a of FIG. 2) disposed in substantially the same direction as the first display 230 as the first illuminance sensor 631 and determine an illuminance sensor (e.g., the sensor modules 226 and 217b of FIG. 2) disposed in a direction opposite to the direction of the first display 230 as the second illuminance sensor 632. In this case, the front-surface sensing value may be a sensing value acquired through the illuminance sensor (e.g., the sensor module 217a of FIG. 2) disposed in the same direction as the first display 230, and the rear-surface sensing value may be a sensing value acquired through the illuminance sensor (e.g., the sensor modules 226 and 217b of FIG. 2) disposed in a direction opposite to the direction of the first display 230.

In case that the electronic device 101 is in the folded state as shown in FIG. 3, an illuminance sensor (e.g., the sensor module 226 of FIG. 3) disposed in substantially the same direction as the second display 251 may be determined as the first illuminance sensor 631, and an illuminance sensor (e.g., the sensor module 217b of FIG. 3) disposed in a direction opposite to the direction of the second display 251 may be determined as the second illuminance sensor 632. In this case, the front-surface sensing value may be a sensing value acquired through the illuminance sensor (e.g., the sensor module 226 of FIG. 3) disposed in the same direction as the second display 251, and the rear-surface sensing value may be a sensing value acquired through the illuminance sensor (e.g., the sensor module 217b of FIG. 3) disposed in a direction opposite to the direction of the second display 251.

According to various embodiments, in case that the electronic device 101 includes a single display 401 as illustrated in FIGS. 4 and 5, the processor 120 may determine an illuminance sensor (e.g., the sensor module 404 of FIG. 4) disposed in the same direction as the single display 401 as the first illuminance sensor 631 and determine an illuminance sensor (e.g., the sensor module 419 of FIG. 5) disposed in a direction opposite to the direction of the single display 401 as the second illuminance sensor 632. In this case, the front-surface sensing value may be a sensing value acquired through the illuminance sensor (e.g., the sensor module 404 of FIG. 4) disposed in substantially the same direction as the single display 401, and the rear-surface sensing value may be a sensing value acquired through the illuminance sensor (e.g., the sensor module 419 of FIG. 5) disposed in a direction opposite to the direction of the single display 401.

According to one embodiment, a motion sensor 640 may be disposed in the inner space (not shown) of the housings 210 and 220. According to one embodiment, the motion sensor 640 may determine direction information of the electronic device 101, based on the direction of gravity (e.g., a direction G of FIG. 10) by using, for example, an acceleration sensor or a gyroscope. According to one embodiment, the processor 120 may acquire direction information of the electronic device 101 through the motion sensor 640, and may determine the direction of the display 620 (e.g., the DD of FIG. 10), based on the acquired direction information of the electronic device 101. According to one embodiment, the processor 120, as will be described later with reference to FIGS. 9 and 10, may calculate an angle (e.g., K2 of FIG. 10) between the direction of the display 620 (e.g., the DD of FIG. 10) and the direction of gravity (e.g., the G direction) and automatically adjust the brightness of the display 620, based on the angle.

According to one embodiment, the memory 130 may store a plurality of lookup tables (LUTs) including a plurality of configuration values for automatically adjusting the brightness of the display 620, based on a sensing value acquired through the illuminance sensor. According to one embodiment, the plurality of LUTs may include a first LUT 611, a second LUT 612, and/or a third LUT 613.

According to an embodiment, the first LUT 611 may include, as a plurality of configuration values according to a case where the surrounding environment of the electronic device 101 is general, display brightness according to wake-up illumination, an illumination value for applying a down hysteresis and display brightness mapped thereto, and/or an illuminance value for applying a high hysteresis and display brightness mapped thereto. Table 1 shows an example of the first LUT 611. According to one embodiment, in case that the surrounding environment of the electronic device 101 is general, the first LUT 611 may include a state in which the electronic device 101 is not gripped or a state in which a touch input is not detected through a portion of the display 620 having a designated area and located within a designated distance from the first illuminance sensor 631. According to one embodiment, as shown in Table 1, the first LUT 611 may include a plurality of first down hysteresis values and high hysteresis values, which are mapped to a plurality of illuminance values. For example, in case that the illuminance acquired through the first illuminance sensor 631 is 500 lux when the display 620 is first turned on, the processor 120 may configure the brightness of the display 620 to 157 nits ($cd/m^2$). For example, in case that a front-surface sensing value smaller than 60 lux is acquired through the first illuminance sensor 631 while the brightness of the display 620 is configured to 157 nits, the processor 120 adjusts the brightness of the display 620 to 115 nits lower than 157 nits. According to one embodiment, the numerical values in Table 1 are only an example and may not be limited thereto.

TABLE 1

| Default | | Down hysteresis | | High hysteresis | |
|---|---|---|---|---|---|
| (Wake-up) | | (When it gets dark) | | (When it gets bright) | |
| | | | | | Adjust |
| Illuminance (lux) | Brightness (nit, $cd/m^2$) | Threshold (lux) | Adjust brightness | Threshold (lux) | brightness (nit, $cd/m^2$) |
| 0 | 13 | — | No adjustment | 10 | 55 |
| 2 | 26 | — | No adjustment | 24 | 102 |
| 10 | 55 | 3 | 27 | 80 | 119 |
| 15 | 75 | 4 | 31 | 120 | 119 |
| 20 | 95 | 5 | 35 | 152 | 122 |
| 25 | 106 | 5 | 35 | 182 | 126 |
| 50 | 112 | 10 | 55 | 300 | 134 |
| 100 | 119 | 40 | 108 | 400 | 147 |
| 300 | 134 | 50 | 112 | 900 | 206 |
| 500 | 157 | 60 | 115 | 1300 | 272 |
| 1000 | 220 | 200 | 126 | 2000 | 442 |
| The rest omitted | The rest omitted | The rest omitted | The rest omitted | The rest omitted | The rest omitted |

According to one embodiment, the second LUT 612 may include a plurality of set values referenced when the requirement of Equation 1 described below is satisfied. Table 2 shows an example of the second LUT 612 according to one embodiment. According to one embodiment, the second LUT 612 may include a plurality of second down hysteresis values mapped to the plurality of illuminance values, as shown in Table 2, and the plurality of second down hysteresis values may be smaller than the plurality of first down hysteresis values included in the first LUT 611. For example, in Table 1, the down hysteresis value mapped to the wake-up illuminance 50 lux is 10 lux, whereas in Table 2, the down hysteresis value mapped to the wake-up illuminance 50 lux is 2 lux, which is smaller than 10 lux. Therefore, in case that the processor 120 performs a down hysteresis operation based on Table 2, the initial brightness of the display 620 may be configured to 112 nits, based on 50 lux, and in case that the illuminance sensing value is lowered to 2 lux or less, the brightness of the display 620 may be adjusted to 26 nits. According to one embodiment, the numerical values in Table 2 are only an example and may not be limited thereto.

TABLE 2

| Default | | Down hysteresis | |
|---|---|---|---|
| (Walk-up) | | (When it gets dark) | |
| | | | Adjust |
| Illuminance (lux) | Brightness (nit, $cd/m^2$) | Threshold (lux) | brightness (nit, $cd/m^2$) |
| 0 | 13 | 0 | 13 |
| 10 | 55 | 0 | 13 |
| 15 | 75 | 1 | 18 |
| 20 | 95 | 1 | 18 |
| 25 | 106 | 1 | 18 |
| 50 | 112 | 2 | 26 |
| 100 | 119 | 8 | 50 |
| 300 | 134 | 10 | 55 |
| 500 | 157 | 12 | 75 |
| 1000 | 220 | 40 | 112 |
| The rest omitted | The rest omitted | The rest omitted | The rest omitted |

According to one embodiment, the third LUT 613 may include a plurality of configuration values referenced when the requirement of Equation 2 described below is satisfied. Table 3 shows an example of the third LUT 613 according to one embodiment. According to one embodiment, the third LUT 613 may include a plurality of third down hysteresis values mapped to the plurality of illuminance values, as shown in Table 3, and the plurality of third down hysteresis values may be smaller than the plurality of second down hysteresis values included in the second LUT 612. For example, in Table 2, the down hysteresis value mapped to the wake-up illuminance 50 lux is 2 lux, whereas in Table 3, the down hysteresis value mapped to the wake-up illuminance 50 lux is 0 lux, which is less than 2 lux. Accordingly, in case that the processor 120 performs a down hysteresis operation based on Table 3, the initial brightness of the display 620 may be configured to 112 nits, based on 50 lux, and in case that the illuminance sensing value reaches 0 lux or less than 2 lux (e.g., 1 lux), the brightness of the display 620 may be adjusted to 13 nits. According to one embodiment, the numerical values in Table 3 are only an example and may not be limited thereto.

TABLE 3

| Default (Wake-up) | | Down hysteresis (When it gets dark) | |
|---|---|---|---|
| | | | Adjust |
| Illuminance (lux) | Brightness (nit, cd/m$^2$) | Threshold (lux) | brightness (nit, cd/m$^2$) |
| 0 | 13 | — | — |
| 10 | 55 | 0 | 13 |
| 15 | 75 | 0 | 13 |
| 20 | 95 | 0 | 13 |
| 25 | 106 | 0 | 13 |
| 50 | 112 | 0 | 13 |
| 100 | 119 | 0 | 13 |
| 300 | 134 | 0 | 13 |
| 500 | 157 | 0 | 13 |
| 1000 | 220 | 0 | 13 |
| The rest omitted | The rest omitted | The rest omitted | The rest omitted |

Figure 7:
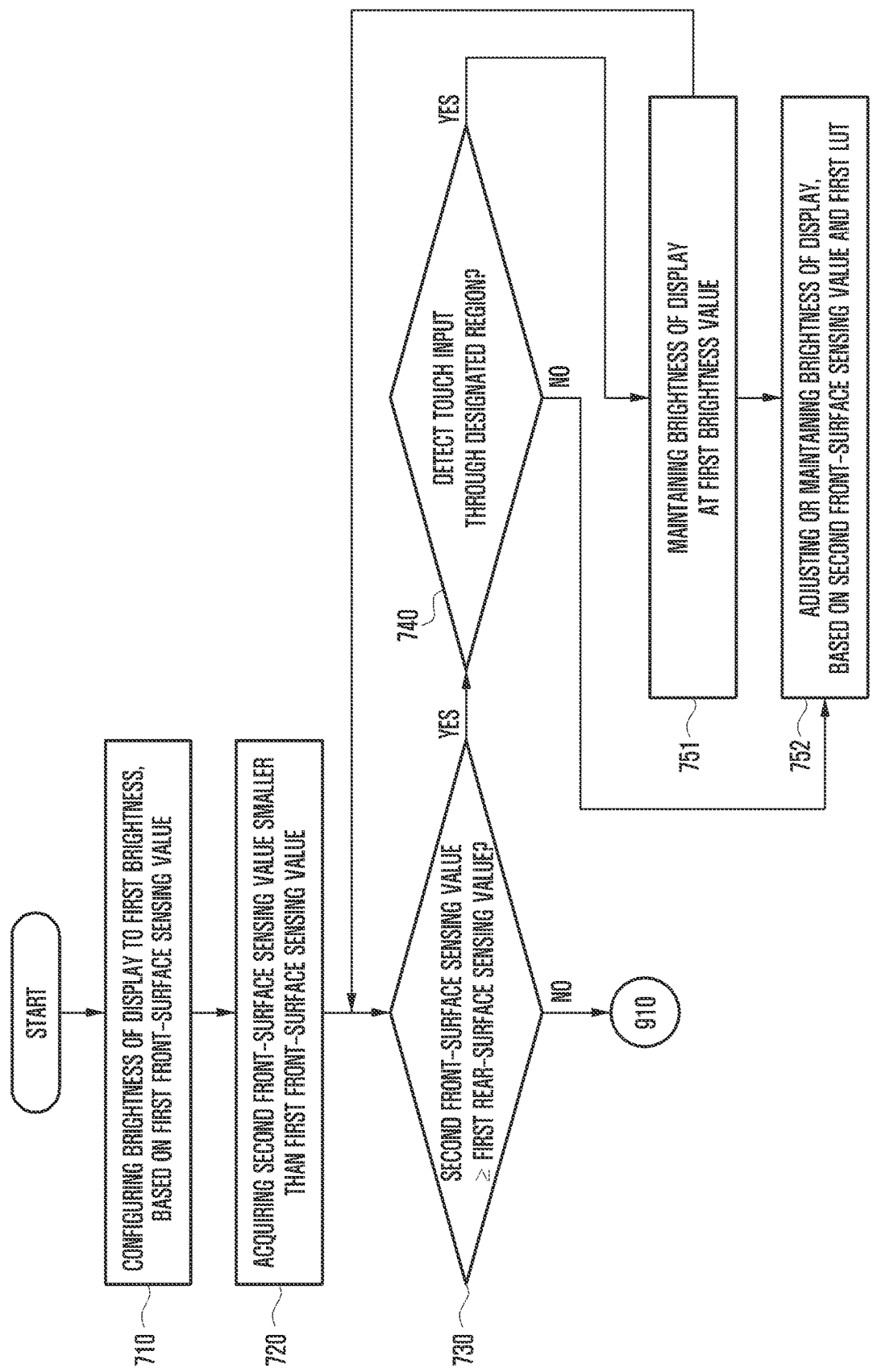
FIG. 7 is a flowchart showing operations of an electronic device according to an embodiment of the disclosure.

FIG. 7 is a flowchart showing operations of an electronic device according to an embodiment of the disclosure.

Figure 8:
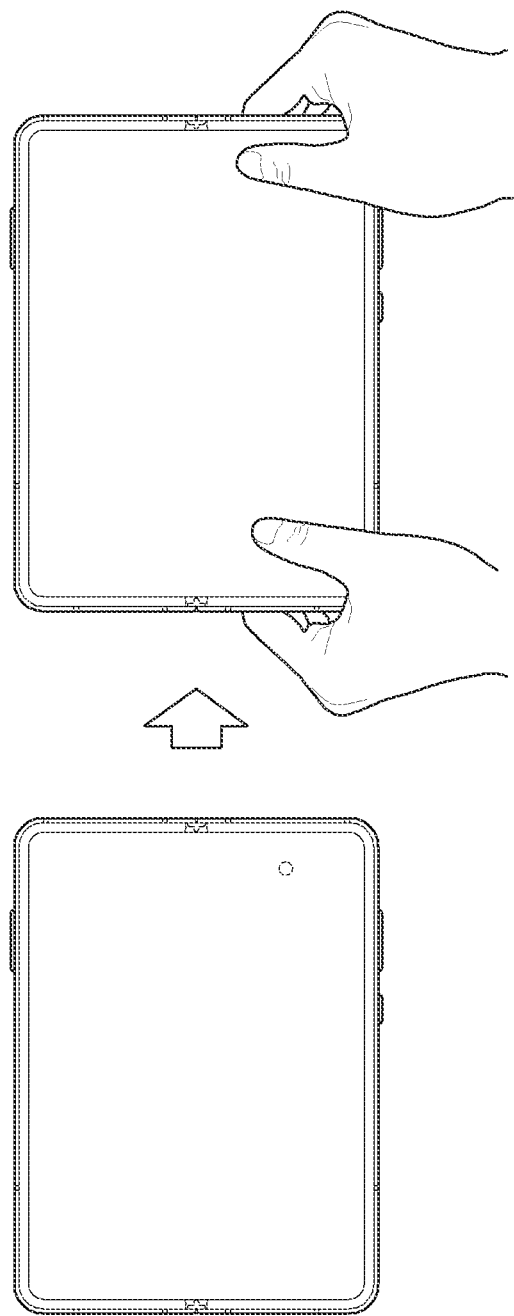
FIG. 8 illustrates an example of a state in which an electronic device is gripped, according to an embodiment of the disclosure.

FIG. 8 illustrates an example of a state in which an electronic device is gripped, according to an embodiment of the disclosure.

At least specific operations of the operations shown in FIG. 7 may be omitted. At least specific operations mentioned with reference to other drawings in the disclosure may be further added before or after at least specific operations shown in FIG. 7.

The operations shown in FIG. 7 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 7.

Referring to FIG. 7, in operation 710, the electronic device 101 according to one embodiment may configure the brightness of the display 620 to the first brightness, based on the first front-surface sensing value. For example, when the display 620 is turned on for the first time, the electronic device 101 detects a first front-surface sensing value corresponding to 50 lux. In this case, the electronic device 101 may configure the brightness of the display 620 to 112 nit, which is a luminance corresponding to 50 lux, with reference to the first LUT 611.

In operation 720, while the brightness of the display 620 is configured to the first brightness, the electronic device 101 may acquire a second front-surface sensing value smaller than the first front-surface sensing value through the first illuminance sensor 631. For example, while the brightness of the display 620 is configured to 112 nits, the electronic device 101 acquires the second front-surface sensing value having a value lower than 50 lux through the first illuminance sensor 631.

In operation 730, the electronic device 101 according to one embodiment may determine whether the second front-surface sensing value is greater than or equal to the first rear-surface sensing value. For example, in case that the second front-surface sensing value having a value lower than 50 lux is acquired through the first illuminance sensor 631 while the brightness of the display 620 is configured to 112 nits, the electronic device 101 compares the second front-surface sensing value having a value lower than 50 lux with the first rear-surface sensing value acquired through the second illuminance sensor 632. According to one embodiment, the electronic device 101 may perform operation 740 in case that the second front-surface sensing value is greater than or equal to the first rear-surface sensing value. According to one embodiment, the electronic device 101 may perform operation 910 described with reference to FIG. 9 in case that the second front-surface sensing value is smaller than the first rear-surface sensing value.

In operation 740, the electronic device 101 according to one embodiment may determine whether a touch input is detected through a designated region in case that the second front-surface sensing value is greater than or equal to the first rear-surface sensing value (e.g., the result of operation 730 is "Yes"). According to one embodiment, the designated region may be located within a designated distance from the first illuminance sensor 631 and may be a portion of the display 620 having a designated area. According to one embodiment, in case that a touch input is detected through a portion of the display 620 having a designated area located within a designated distance from the first illuminance sensor 631, referring to FIG. 8, the electronic device 101 may determine that the front-surface sensing value detected through the first illuminance sensor 631 has been lowered by a user's touch or grip. If the touch input is not detected, the electronic device 101 may determine that the front-surface sensing value is lowered even though there is no user's touch or grip. According to one embodiment, the electronic device 101 may perform operation 751 in case that a touch input is detected, and may perform operation 752 in case that a touch input is not detected.

In operation 751, the electronic device 101 according to one embodiment may maintain the brightness of the display 620 at the first brightness in case that a touch input is detected through a designated region (e.g., the result of operation 740 is "Yes"). According to one embodiment, the electronic device 101 may maintain the brightness of the display 620 at the first brightness, based on the determination that the front-surface sensing value detected through the first illuminance sensor 631 has been lowered by a user's touch or grip.

In operation 752, in case that a touch input is not detected through the designated region (e.g., the result of operation 740 is "No"), the electronic device 101 according to one embodiment may maintain or adjust the brightness of the display 620, based on the second front-surface sensing value and the first LUT 611. For example, the electronic device 101 compares the second front-surface sensing value with the down hysteresis stored in the first LUT 611.

According to one embodiment, in case that the second front-surface sensing value is greater than the down hysteresis stored in the first LUT 611, the electronic device 101 may maintain the brightness of the display 620 at the first brightness. For example, while the brightness of the display 620 is configured to 112 nits, the electronic device 101 may acquire a second front-surface sensing value having a value lower than 50 lux through the first illuminance sensor 631 and may compare the second front-surface sensing value with the down hysteresis of 10 lux stored in the first LUT 611. In case that the second front-surface sensing value is greater than 10 lux, the electronic device 101 may maintain the brightness of the display 620 at 112 nits.

According to one embodiment, in case that the second front-surface sensing value is less than or equal to the down hysteresis stored in the first LUT 611, the electronic device 101 may adjust the brightness of the display 620 to a value lower than the first brightness. For example, while the brightness of the display 620 is configured to 112 nits, the electronic device 101 acquires a second front-surface sensing value having a value lower than 50 lux through the first illuminance sensor 631 and may compare the second front-surface sensing value with the down hysteresis of 10 lux stored in the first LUT 611. In case that the second front-surface sensing value is less than or equal to 10 lux, the electronic device 101 may adjust the brightness of the display 620 from 112 nits to 55 nits.

Figure 9:
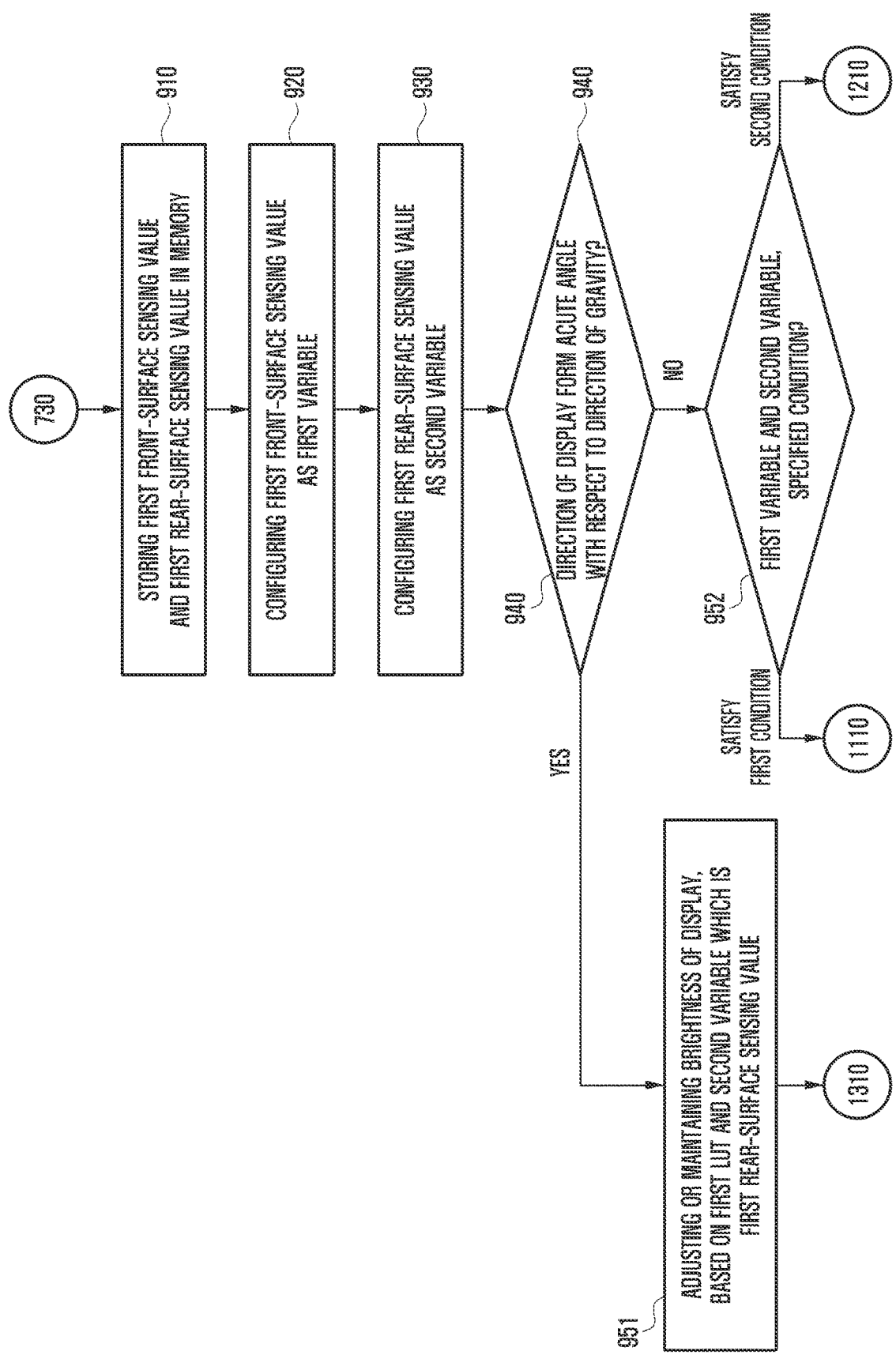
FIG. 9 is a flowchart showing operations after operation 730 of FIG. 7 among the operations of an electronic device according to an embodiment of the disclosure.

FIG. 9 is a flowchart showing operations after operation 730 of FIG. 7 among the operations of an electronic device according to an embodiment of the disclosure.

Figure 10:
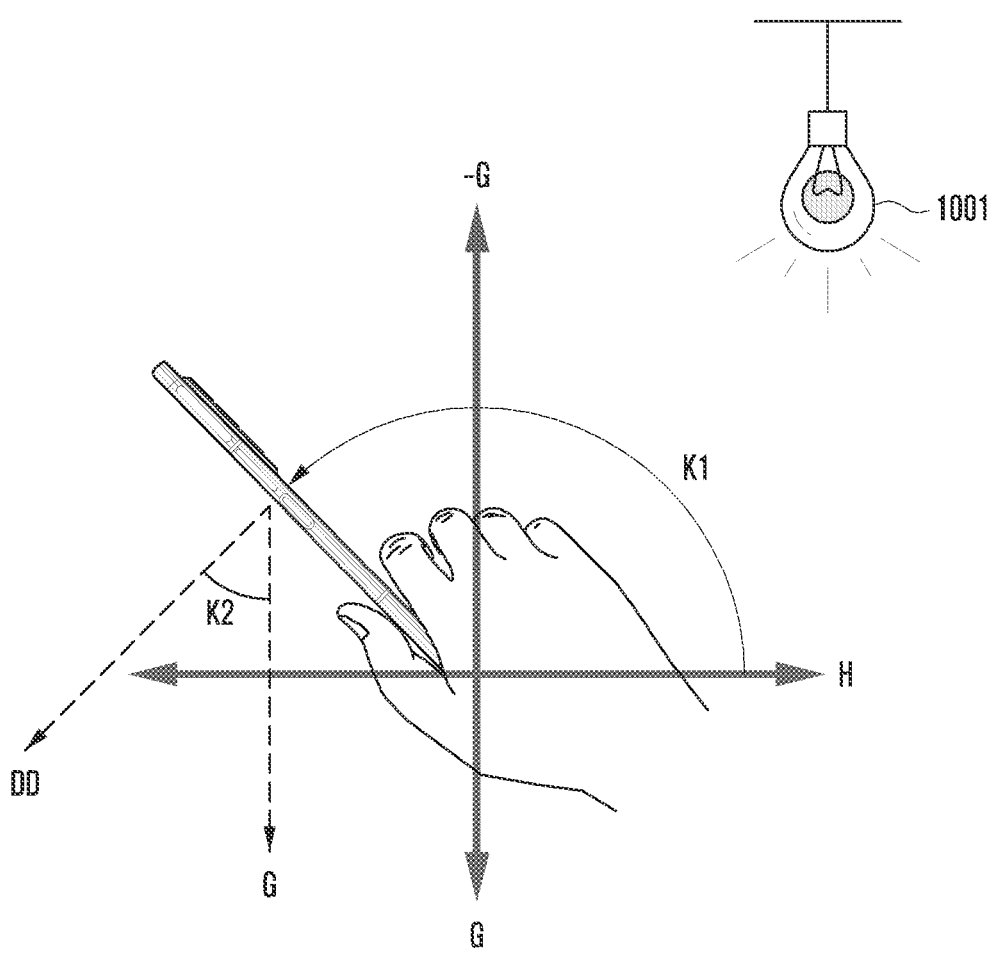
FIG. 10 illustrates an example of a state in which a direction of a display of an electronic device forms an acute angle with respect to a direction of gravity, according to an embodiment of the disclosure.

FIG. 10 illustrates an example of a state in which the direction of the display 620 (e.g., the DD of FIG. 10) of an electronic device forms an acute angle with respect to the direction of gravity (e.g., the G direction), according to an embodiment of the disclosure.

At least specific operations of the operations shown in FIG. 9 may be omitted. At least specific operations mentioned with reference to other drawings in the disclosure may be further added before or after the at least specific operations shown in FIG. 9.

The operations shown in FIG. 9 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 9.

According to one embodiment, as in operation 730 described with reference to FIG. 7, in case that the second front-surface sensing value is smaller than the first rear-surface sensing value, the electronic device 101 may perform operation 910.

Referring to FIGS. 9 and 10, in operation 910, the electronic device 101 according to one embodiment may store the first front-surface sensing value and the first rear-surface sensing value in the memory 130. According to one embodiment, the electronic device 101 may store, in the memory 130, the front-surface sensing value which is prior to the lowered front-surface sensing value. For example, the electronic device 101 stores, in the memory 130, a front-surface sensing value that is a reference illuminance at which the luminance of the display 620 is currently configured. According to one embodiment, in case that a change in the front-surface sensing value occurs, for example, in case that the front-surface sensing value decreases, the electronic device 101 may acquire a first rear-surface sensing value through the second illuminance sensor 632 and may store the acquired first rear-surface sensing value in the memory 130. According to one embodiment, operation 910 may be omitted.

In operation 920, the electronic device 101 according to one embodiment may configure the first front-surface sensing value as the first variable (V1). According to one embodiment, the first variable (V1) may be a value applied to a condition (e.g., Equation 1 or Equation 2) for determining (e.g., determining whether a specified condition is satisfied) a state of the electronic device 101 in a subsequent operation 952.

In operation 930, the electronic device 101 according to one embodiment may configure the first rear-surface sensing value as the second variable (V2). According to one embodiment, the second variable (V2) may be a value applied to a condition (e.g., Equation 1 or Equation 2) for determining (e.g., determining whether a specified condition is satisfied) a state of the electronic device 101 in a subsequent operation 952.

In operation 940, the electronic device 101 according to one embodiment may determine whether the direction of the display 620 (e.g., the vertical direction of the display surface, the DD of FIG. 10) and the direction of gravity (e.g., the G direction) form an acute angle. According to one embodiment, the electronic device 101 may determine the posture of the electronic device 101 or the direction of the display 620 (e.g., the DD of FIG. 10) by using the motion sensor 640. For example, as shown in FIG. 10, the electronic device 101 detects the angle (e.g., an angle at which the display surface forms with respect to the ground or the horizontal plane (the H-axis direction), K1 of FIG. 10, assuming that one corner of the electronic device is a rotational axis) at which the electronic device 101 forms with respect to the ground or the horizontal plane (e.g., the H-axis direction of FIG. 10). For example, as shown in FIG. 10, in case that the angle (K1) of the electronic device 101 is an obtuse angle (e.g., 135 degrees) with respect to the ground or the horizontal plane (the H-axis direction), the electronic device 101 determines that the display 620 faces the floor and the angle (K2) formed between the direction of the display 620 (e.g., the DD of FIG. 10) and the direction of gravity (e.g., the G direction of FIG. 10) is an acute angle. The state in which the direction of the display 620 (e.g., the DD of FIG. 10) and the direction of gravity (e.g., the G direction) form an acute angle may be, for example, a state in which a user lifts the electronic device 101 upward while holding the electronic device 101 or a state in which a user looks at the display 620 of the electronic device 101 while lying down. In this case, the second illuminance sensor 632 faces the sunlight (or illumination) 1001, and accordingly, the rear-surface sensing value acquired through the second illumination sensor 632 may be greater than the front-surface sensing value acquired through the first illumination sensor 631 toward which the display 620 faces. In order to determine whether the electronic device 101 is in the above state, the electronic device 101 may determine whether the direction of the display 620 (e.g., the DD of FIG. 10) and the direction of gravity (e.g., the G direction) form an acute angle. According to one embodiment, the criterion of the determination performed in operation 940 is not limited to whether the direction of the display 620 (e.g., the DD of FIG. 10) and the direction of gravity (e.g., the G direction) form less than 90 degrees, and may be variously changed.

In the electronic device 101 according to one embodiment, operation 951 may be performed in case that the direction of the display 620 (e.g., the DD of FIG. 10) and the direction of gravity (e.g., the G direction) form an acute angle (e.g., the result of operation 940 is "Yes").

In the electronic device 101 according to one embodiment, operation 952 may be performed in case that the direction of the display 620 (e.g., the DD of FIG. 10) and the direction of gravity (e.g., the G direction) form a right angle or an obtuse angle rather than an acute angle (e.g., the result of operation 940 is "No").

In operation 951, the electronic device 101 according to one embodiment may adjust or maintain the brightness of the display 620, based on the first LUT 611 and the second variable (V2) that is the first rear-surface sensing value. For example, the electronic device 101 compares the first rear-surface sensing value with the down hysteresis stored in the first LUT 611.

According to one embodiment, in case that the first rear-surface sensing value is greater than the down hysteresis stored in the first LUT 611, the electronic device 101 may maintain the brightness of the display 620 at the first brightness. For example, while the brightness of the display 620 is configured to 112 nits, the electronic device 101 acquires a first rear-surface sensing value having a value lower than 50 lux through the second illuminance sensor 632 and may compare the first rear-surface sensing value with the down hysteresis of 10 lux stored in the first LUT 611. In case that the first rear-surface sensing value is greater than 10 lux and less than 50 lux, the electronic device 101 may maintain the brightness of the display 620 at 112 nits.

According to one embodiment, in case that the first rear-surface sensing value is smaller than the down hysteresis stored in the first LUT 611, the electronic device 101 may adjust the brightness of the display 620 to a value lower than the first brightness. For example, while the brightness of the display 620 is configured to 112 nits, the electronic device 101 acquires a first rear-surface sensing value having a value lower than 50 lux through the second illuminance sensor 632 and compares the first rear-surface sensing value with the down hysteresis of 10 lux stored in the first LUT 611. In case that the first rear-surface sensing value is less than or equal to 10 lux, the electronic device 101 may adjust the brightness of the display 620 from 112 nits to 55 nits.

According to one embodiment, the electronic device 101 may perform operation 1310, after operation 951, described with reference to FIG. 13.

In operation 952, the electronic device 101 according to one embodiment may determine (e.g., determine whether a specified condition is satisfied) a state of the electronic device 101 by using the first variable (V1) and the second variable (V2). According to one embodiment, the electronic device 101 may determine whether a first specified condition or a second specific condition using the first variable (V1) and the second variable (V2) is satisfied. According to one embodiment, in case that the first condition using the first variable (V1) and the second variable (V2) is satisfied, the electronic device 101 may perform operation 1110 described with reference to FIG. 11. According to one embodiment, in case that the second condition using the first variable (V1) and the second variable (V2) is satisfied, the electronic device 101 may perform operation 1210 described with reference to FIG. 12.

According to one embodiment, the first condition is, as shown in Equation 1, a condition in which the second variable (V2) is greater than a first reference value (R1), and a ratio (i.e., V1/V2) of the first variable (V1) to the second variable (V2) is less than or equal to a second reference value (R2).

$$V2 > R1 \text{ and } \frac{V1}{V2} \le R2 \qquad \text{Equation 1}$$

According to one embodiment, the second condition is, as shown in Equation 2, a case in which the second variable (V2) is less than or equal to the first reference value (R1) or a ratio (i.e., V1/V2) of the first variable (V1) to the second variable (V2) is greater than the second reference value R2.

$$V2 \le R1 \text{ or } \frac{V1}{V2} > R2 \qquad \text{Equation 2}$$

According to one embodiment, the first reference value (R1) and the second reference value (R2), which are values determined by experimental measurements, are not limited to specific values, and may be variously changed.

According to one embodiment, in case that a rear-surface sensing value acquired through the second illuminance sensor 632 is greater than a front-surface sensing value acquired through the first illuminance sensor 631 and the first condition is satisfied, the processor 120 may determine that the rear-surface sensing value is sufficiently secured and the variation is low. According to one embodiment, the processor 120 may perform operation 1110 described with reference to FIG. 11, based on determination that the rear-surface sensing value is sufficiently secured and the variation is low.

According to one embodiment, in case that the rear-surface sensing value acquired through the second illuminance sensor 632 is greater than the front-surface sensing value acquired through the first illuminance sensor 631 and the second condition is satisfied, the processor 120 may determine that the rear-surface sensing value is not sufficiently secured and the variation is high. According to one embodiment, the processor 120 may perform operation 1210 described with reference to FIG. 12, based on determination that the rear-surface sensing value is not sufficiently secured and the variation is high.

Figure 11:
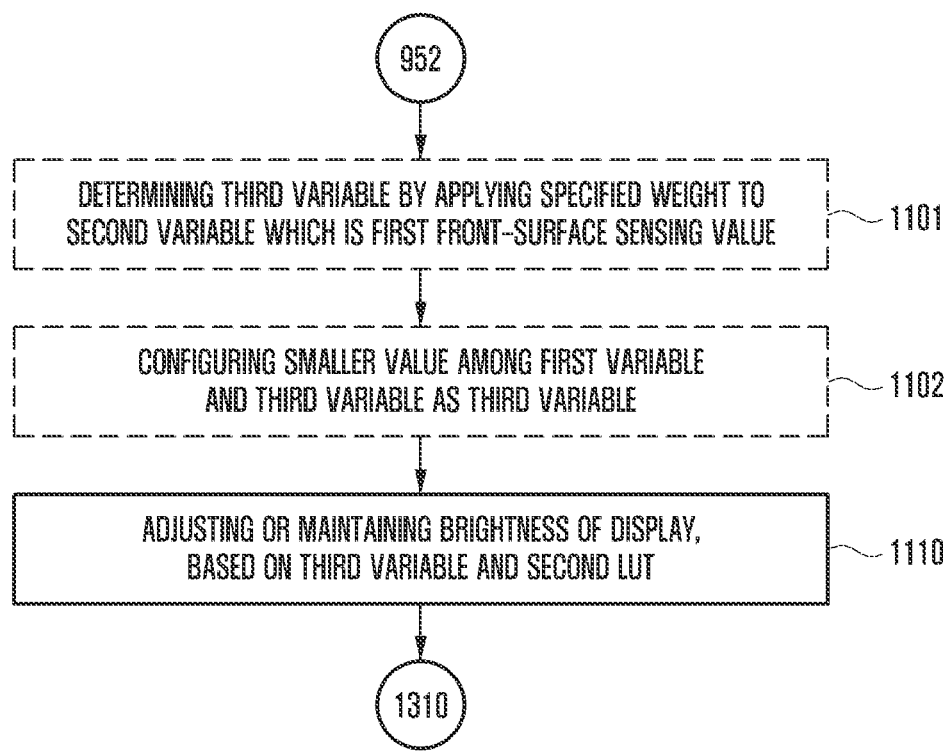
FIG. 11 is a flowchart showing operations after operation 952 of FIG. 9 among the operations of an electronic device according to an embodiment of the disclosure.

FIG. 11 is a flowchart showing operations after operation 952 of FIG. 9 among the operations of an electronic device according to an embodiment of the disclosure.

At least specific operations of the operations shown in FIG. 11 may be omitted. At least specific operations mentioned with reference to other drawings in the disclosure may be further added before or after at least specific operations shown in FIG. 11.

The operations shown in FIG. 11 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 11.

According to one embodiment, in case that a rear-surface sensing value acquired through the second illuminance sensor 632 is greater than a front-surface sensing value acquired through the first illuminance sensor 631 and the first condition is satisfied, the processor 120 may determine that the rear-surface sensing value is sufficiently secured and the variation is low. According to one embodiment, the processor 120 may perform operation 1110 based on determination that the rear-surface sensing value is sufficiently secured and the variation is low. For example, the processor 120 may refer to the second LUT 612 to which a hysteresis relatively wider than a normal hysteresis such as the first LUT 611 is applied.

Referring to FIG. 11, the electronic device 101 may perform operations 1101 and 1102 before performing operation 1110. According to one embodiment, operations 1101 and 1102 may be performed at any stage before operation 1110 is performed.

In operation 1101, the electronic device 101 according to one embodiment may determine the third variable by applying a specified weight to the second variable (V2) that is the first rear-surface sensing value. According to one embodiment, the electronic device 101 may calculate the third variable by multiplying the second variable (V2), which is the first rear-surface sensing value, by a correction value of a specific N value. In various embodiments, the electronic device 101 may calculate the third variable by performing various operations, for example, at least one arithmetic operation, without performing a multiplication on the second variable (V2). According to one embodiment, the weight or at least one arithmetic operation applied to the second variable (V2) may be configured by a value in consideration of the reflectance of the display 620 and the characteristics of the first illuminance sensor 631 and the second illuminance sensor 632.

In operation 1102, the electronic device 101 according to one embodiment may compare the first variable (V1) with the third variable calculated by applying a weight or at least one arithmetic operation to the second variable (V2). According to one embodiment, the electronic device 101 may select a smaller value from the first variable (V1) and the third variable and update the selected value as the third variable. For example, in case that the third variable is less than or equal to the first variable (V1), the electronic device 101 may maintain the third variable. For example, in case that the third variable acquired by performing a weight value or at least one arithmetic operation on the second variable (V2) is greater than the first variable (V1), the electronic device 101 configures a value corresponding to the first variable (V1) as the third variable.

In operation 1110, the electronic device 101 according to one embodiment may adjust or maintain the brightness of the display 620, based on the third variable and the second LUT 612. For example, the electronic device 101 compares the third variable with the down hysteresis stored in the second LUT 612.

According to one embodiment, in case that the third variable is greater than the down hysteresis stored in the second LUT 612, the electronic device 101 may maintain the brightness of the display 620 at the first brightness. For example, the electronic device 101 determines that the first condition is satisfied while the brightness of the display 620 is configured to 112 nits, and compares the third variable with the down hysteresis of 2 lux stored in the second LUT 612. In case that the third variable is greater than 2 lux and less than 50 lux, the electronic device 101 may maintain the brightness of the display 620 at 112 nits.

According to one embodiment, in case that the third variable is less than the down hysteresis stored in the second LUT 612, the electronic device 101 may adjust the brightness of the display 620 to a value lower than the first brightness. For example, the electronic device 101 determines that the first condition is satisfied while the brightness of the display 620 is configured to 112 nits, and may compare the third variable with the down hysteresis of 2 lux stored in the second LUT 612. In case that the third variable is less than or equal to 2 lux, the electronic device 101 may adjust the brightness of the display 620 from 112 nits to 26 nits.

Figure 12:
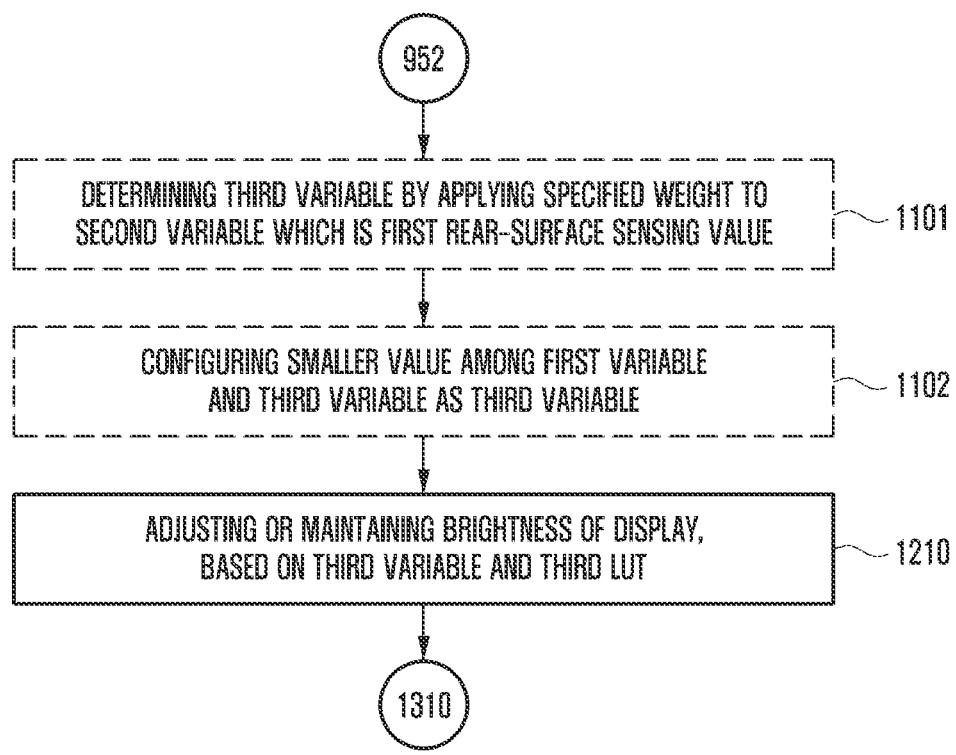
FIG. 12 is a flowchart showing operations after operation 952 of FIG. 9 among the operations of an electronic device according to an embodiment of the disclosure.

FIG. 12 is a flowchart showing operations after operation 952 of FIG. 9 among the operations of an electronic device according to an embodiment of the disclosure.

At least specific operations of the operations shown in FIG. 12 may be omitted. At least specific operations mentioned with reference to other drawings in the disclosure may be further added before or after at least specific operations shown in FIG. 12.

The operations shown in FIG. 12 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 12.

Referring to FIG. 12, in case that the rear-surface sensing value acquired through the second illuminance sensor 632 is greater than the front-surface sensing value acquired through the first illuminance sensor 631 and the second condition is satisfied, the processor 120 may determine that the rear-surface sensing value is not sufficiently secured and the variation is high. According to one embodiment, the processor 120 may perform operation 1210 based on determination that the rear-surface sensing value is not sufficiently secured and the variation is high. For example, by referring to the third LUT 613 to which an extremely wide hysteresis is applied, the processor 120 performs an operation of adjusting the brightness of the display 620 only in case that the electronic device 101 is moved to an extreme environment such as a dark room (e.g., an environment in which illuminance is a reference illuminance (e.g., less than about 1 lux)).

According to one embodiment, the electronic device 101 may perform operations 1101 and 1102 before performing operation 1210. According to one embodiment, operations 1101 and 1102 may be performed at any stage before operation 1210 is performed. According to one embodiment, operations 1101 and 1102 shown in FIG. 12 may be substantially the same as operations 1101 and 1102 shown in FIG. 11.

In operation 1210, the electronic device 101 according to one embodiment may adjust or maintain the brightness of the display 620, based on the third variable and the third LUT 613. For example, the electronic device 101 compares the third variable with the down hysteresis stored in the third LUT 613.

According to one embodiment, in case that the third variable is greater than the down hysteresis stored in the second LUT 612, the electronic device 101 may maintain the brightness of the display 620 at the first brightness. For example, the electronic device 101 determines that the second condition is satisfied while the brightness of the display 620 is configured to 112 nits, and compares the third variable with the down hysteresis of 0 lux stored in and the third LUT 613. In case that the third variable is greater than 0 lux and less than 50 lux, the electronic device 101 may maintain the brightness of the display 620 at 112 nits.

According to one embodiment, in case that the third variable is less than or equal to the down hysteresis stored in the third LUT 613, the electronic device 101 may adjust the brightness of the display 620 to a value lower than the first brightness. For example, the electronic device 101 determines that the second condition is satisfied while the brightness of the display 620 is configured to 112 nits, and may compare the third variable with the down hysteresis of 0 lux stored in the third LUT 613. In case that the third variable is 0 lux, the electronic device 101 may adjust the brightness of the display 620 from 112 nits to 13 nits.

According to various embodiments, the down hystereses stored in the third LUT 613 may be smaller than the plurality of first down hysteresis values included in the second LUT 612. For example, in Table 2, the down hysteresis value mapped to the wake-up illuminance 50 lux is 2 lux, whereas in Table 3, the down hysteresis value mapped to the wake-up illuminance 50 lux is 0 lux, which is less than 2 lux.

According to various embodiments, the third down hysteresis of the third LUT 613 mentioned in the above example is not limited to 0 lux and may be variously changed. According to various embodiments, the plurality of third down hysteresis values stored in the third LUT 613 may be smaller than the plurality of second down hysteresis values included in the second LUT 612. For example, in Table 2, the down hysteresis value mapped to the wake-up illuminance 50 lux is 2 lux, and in Table 3, the down hysteresis value mapped to the wake-up illuminance 50 lux may be any value as long as the same is a value less than 2 lux. For example, in Table 3, the down hysteresis value mapped to the wake-up illuminance of 50 lux may be configured to 1 lux as well as 0 lux.

Figure 13:
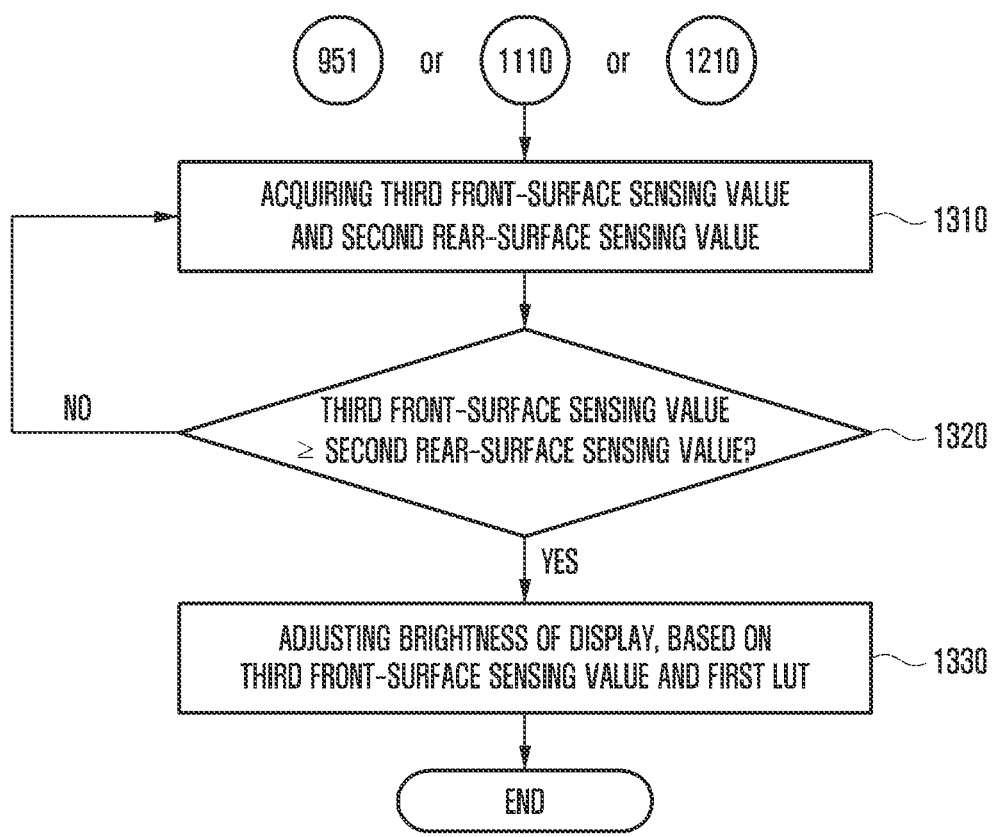
FIG. 13 is a flowchart showing operations of an electronic device in case that a variation occurs between a front-surface sensing value acquired from a first illuminance sensor and a second front-surface sensing value acquired from a second illuminance sensor, according to an embodiment of the disclosure.

FIG. 13 is a flowchart showing an operation of an electronic device in case that a variation occurs between a front-surface sensing value acquired from a first illuminance sensor and a second front-surface sensing value acquired from a second illuminance sensor, according to an embodiment of the disclosure.

At least specific operations of the operations shown in FIG. 13 may be omitted. At least specific operations mentioned with reference to other drawings in the disclosure may be further added before or after at least specific operations shown in FIG. 13.

The operations shown in FIG. 13 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 13.

Referring to FIG. 13, the electronic device 101 may perform operation 1310 in case that a change occurs between the front-surface sensing value acquired from the first illuminance sensor 631 and the second front-surface sensing value acquired from the second illuminance sensor 632. For example, the electronic device 101 performs operation 1310 after operation 951 described with reference to FIG. 9, operation 1110 described with reference to FIG. 11, or operation 1210 described with reference to FIG. 12.

In operation 1310, the electronic device 101 according to one embodiment may acquire the third front-surface sensing value through the first illuminance sensor 631 after acquiring the second front-surface sensing value, and acquire the second rear-surface sensing value through the second illuminance sensor 632 after acquiring the first rear-surface sensing value.

For example, as described with reference to operation 951 of FIG. 9, the electronic device 101 according to one embodiment newly acquires a third front-surface sensing value and a second rear-surface sensing value while the brightness of the display is adjusted or maintained based on the first LUT and the second variable which is the first rear-surface sensing value.

For example, as described with reference to operation 1110 of FIG. 11, the electronic device 101 according to one embodiment newly acquires a third front-surface sensing value and a second rear-surface sensing value while the brightness of the display is adjusted or maintained based on the second LUT value and the third variable which is corrected rear-surface sensing value.

For example, as described with reference to operation 1210 of FIG. 12, the electronic device 101 according to one embodiment newly acquires a third front-surface sensing value and a second rear-surface sensing value while the brightness of the display is adjusted or maintained based on the third LUT and the third variable which is a corrected rear-surface sensing value.

In operation 1320, the electronic device 101 according to one embodiment may determine whether the third front-surface sensing value is greater than or equal to the second rear-surface sensing value. For example, in case that the second front-surface sensing value is smaller than the first rear-surface sensing value (e.g., the result of operation 730 of FIG. 7 is "No"), the electronic device 101 performs operations described with reference to FIGS. 9 to 12. In case that the newly acquired front-surface sensing value (i.e., the third front-surface sensing value) is greater than or equal to the newly acquired rear-surface sensing value (i.e., the second rear-surface sensing value), the electronic device 101 may determine that the brightness state between the front-surface sensing value and the rear-surface sensing value is inverted.

According to one embodiment, in case that the third front-surface sensing value is greater than or equal to the second rear-surface sensing value (e.g., the result of operation 1320 is "Yes"), the electronic device 101 may perform operation 1330.

According to one embodiment, in case that the third front-surface sensing value is smaller than the second rear-surface sensing value (e.g., the result of operation 1320 is "No"), the electronic device 101 may perform operation 1310 again.

In operation 1330, the electronic device 101 according to one embodiment may maintain or adjust the brightness of the display 620, based on the third front-surface sensing value and the first LUT 611. For example, the electronic device 101 maintains or adjusts the brightness of the display 620, based on the third front-surface sensing value and the down hysteresis and/or the high hysteresis in the first LUT 611.

For example, in case that the electronic device 101 is moved to an extreme environment such as a dark room (e.g., an environment in which the illuminance is a reference illuminance (e.g., less than about 1 lux)), the electronic device 101 determines, according to operation 1320, that the brightness state between the front-surface sensing value and the rear-surface sensing value is inverted. In this case, the electronic device 101 may maintain or adjust the brightness of the display 620, based on the front-surface sensing value rather than the rear-surface sensing value, that is, the third front-surface sensing value, and the down hysteresis and/or the high hysteresis in the first LUT 611.

For example, in case that the electronic device 101 is moved from a dark room (e.g., an environment in which illuminance is a reference illuminance (e.g., less than about 1 lux)) to a bright environment such as outdoors, the electronic device 101 determines, according to operation 1320, that the brightness state between the front surface-sensing and the rear-surface sensing value is inverted. In this case, the electronic device 101 may maintain or adjust the brightness of the display 620, based on the front-surface sensing value rather than the rear-surface sensing value, that is, the third front-surface sensing value, and the down hysteresis and/or the high hysteresis in the first LUT 611.

According to one embodiment, as described with reference to operation 951 of FIG. 9, the electronic device 101 may newly acquire a third front-surface sensing value and a second rear-surface sensing value while the brightness of the display 620 is adjusted or maintained based on the second variable, which is the first rear-surface sensing value, and the first LUT 611 (e.g., Table 1). According to one embodiment, in case that the third front-surface sensing value is greater than or equal to the second rear-surface sensing value (e.g., the result of operation 1320 is "Yes"), the electronic device 101 may maintain or adjust the brightness of the display 620, based on the third front-surface sensing value and the first LUT 611.

According to one embodiment, in operation 951 of FIG. 9, the electronic device 101 may configure the brightness of the display 620 at 112 nits, based on the second variable (V2), which is the first rear-surface sensing value, and the down hysteresis of 50 lux in the first LUT 611. In case that the electronic device 101 confirms that a condition in which the result of operation 1320 is "Yes" is satisfied, while the brightness of the display 620 is configured to 112 nits, the electronic device 101 may compare the third front-surface sensing value with the down hysteresis of 10 lux and the high hysteresis of 300 lux, which are mapped to the wake-up brightness 112 nits (or wake-up illuminance 50 lux) in the first LUT 611 (e.g. Table 1).

For example, in case that the third front-surface sensing value is less than or equal to the down hysteresis of 10 lux stored in the first LUT 611 (e.g., Table 1), the electronic device 101 may adjust the brightness of the display 620 from 112 nits to 55 nits.

For example, in case that the third front-surface sensing value is greater than the down hysteresis of 10 lux stored in the first LUT 611 (e.g., Table 1) and less than or equal to the down hysteresis of 300 lux stored in the first LUT 611 (e.g., Table 1), the electronic device 101 may maintain the brightness of the display 620 at 112 nits.

For example, in case that the third front-surface sensing value is greater than the high hysteresis of 300 lux stored in the first LUT 611 (e.g., Table 1), the electronic device 101 may adjust the brightness of the display 620 from 112 nit to 134 nit.

According to one embodiment, as described with reference to operation 1110 of FIG. 11, the electronic device 101 may newly acquire a third front-surface sensing value and a second rear-surface sensing value while the brightness of the display 620 is adjusted or maintained based on the third variable (V3), which is a corrected surface-sensing value, and the second LUT 612 (e.g., Table 2). According to one embodiment, in case that the third front-surface sensing value is greater than or equal to the second rear-surface sensing value (e.g., the result of operation 1320 is "Yes"), the electronic device 101 may maintain or adjust the brightness of the display 620, based on the third front-surface sensing value and the first LUT 611.

According to one embodiment, in operation 1110 of FIG. 11, the electronic device 101 may configure the brightness of the display 620 to 55 nits, based on the down hysteresis of 10 lux in the second LUT 612 and the third variable (V3) which is a corrected rear-surface sensing value. In case that the electronic device 101 confirms that a condition in which the result of operation 1320 is "Yes" is satisfied, while the brightness of the display 620 is configured to 55 nits, the electronic device 101 may compare the third front-surface sensing value with the down hysteresis of 3 lux and the high hysteresis of 80 lux, which are mapped to the wake-up brightness of nits (or the wake-up illuminance of 10 lux) in the first LUT 611 (e.g., Table 1).

For example, in case that the third front-surface sensing value is less than or equal to 3 lux of the down hysteresis stored in the first LUT 611 (e.g., Table 1), the electronic device 101 may adjust the brightness of the display 620 from 55 nits to 27 nits.

For example, in case that the third front-surface sensing value is greater than 3 lux of the down hysteresis stored in the first LUT 611 (e.g., Table 1) and less than or equal to 80 lux of the high hysteresis stored in the first LUT 611 (e.g., Table 1), the electronic device 101 may maintain the brightness of the display 620 at 55 nits.

For example, in case that the third front-surface sensing value is greater than 80 lux of the high hysteresis stored in the first LUT 611 (e.g., Table 1), the electronic device 101 may adjust the brightness of the display 620 from 55 nits to 119 nits.

According to one embodiment, as described with reference to operation 1210 of FIG. 12, the electronic device 101 may newly acquire a third front-surface sensing value and a second rear-surface sensing value while the brightness of the display 620 is adjusted or maintained based on the third LUT 613 (e.g., Table 3) and the third variable (V3) which is a corrected rear-surface sensing value. According to one embodiment, in case that the third front-surface sensing value is greater than or equal to the second rear-surface sensing value (e.g., the result of operation 1320 is "Yes"), the electronic device 101 may maintain or adjust the brightness of the display 620, based on the third front-surface sensing value and the first LUT 611.

According to one embodiment, in operation 1210 of FIG. 12, the electronic device 101 may configure the brightness of the display 620 to 13 nits, based on 0 lux of the down hysteresis in the third LUT 613 and the third variable (V3) which is a corrected rear-surface sensing value. In case that the electronic device 101 confirms that a condition in which the result of operation 1320 is "Yes" is satisfied, while the brightness of the display 620 is configured to 13 nits, the electronic device 101 may compare the third front-surface sensing value with the high hysteresis of 10 lux mapped to the wake-up brightness of 13 nits (or the wake-up illuminance of 0 lux) in the first LUT 611 (e.g., Table 1). For example, as shown in Table 1, in case that the wake-up illuminance is 2 lux or less than 2 lux, the electronic device 101 may perform only a high hysteresis operation without performing down hysteresis adjustment.

For example, in case that the third front-surface sensing value is greater than 10 lux of the high hysteresis stored in the first LUT 611 (e.g., Table 1), the electronic device 101 may adjust the brightness of the display 620 from 13 nits to 55 nits.

Figure 14:
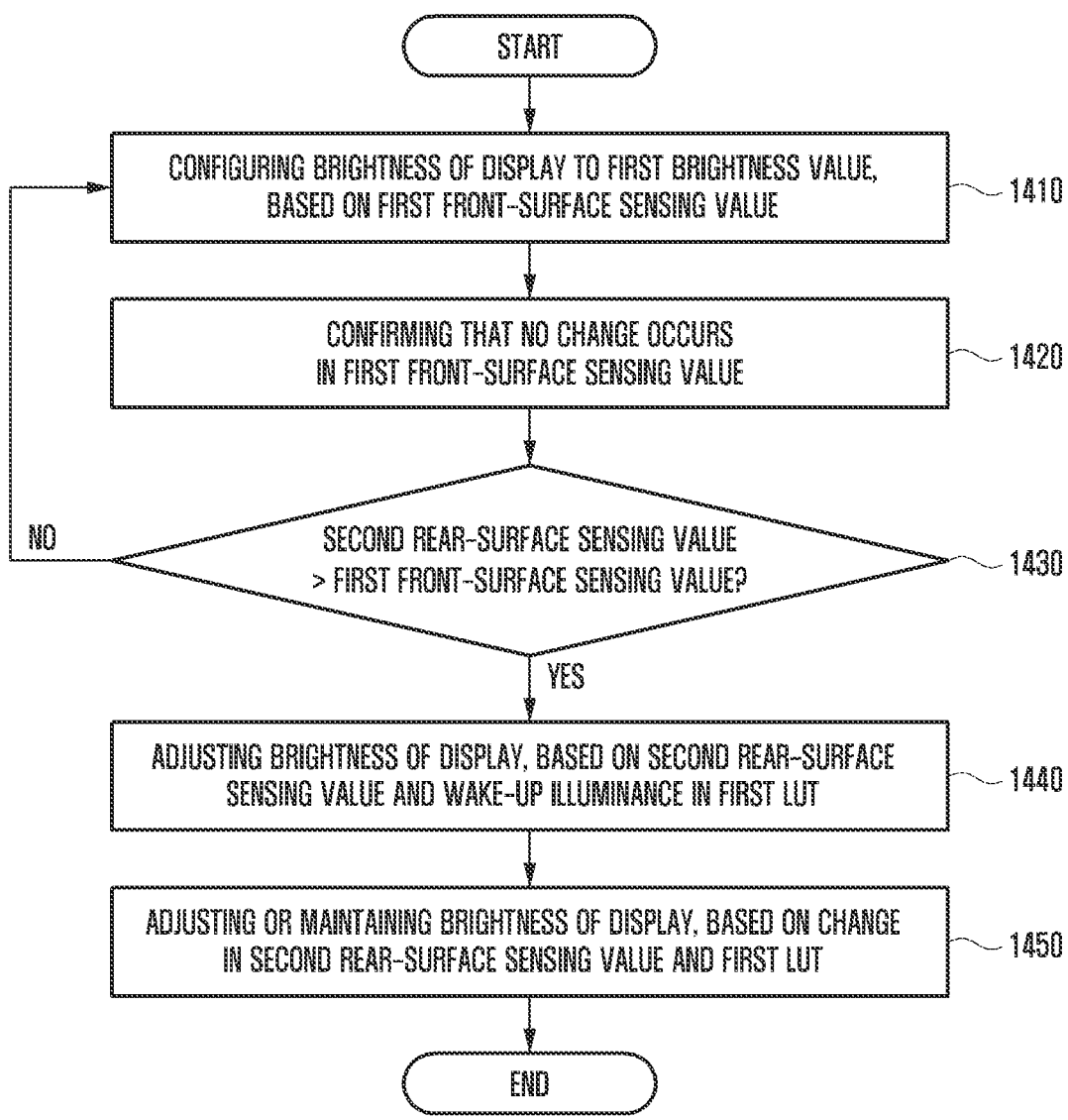
FIG. 14 is a flowchart showing operations performed in case that an electronic device is in a backlight state, according to an embodiment of the disclosure.

FIG. 14 is a flowchart showing operations performed in case that the electronic device 101 is in a backlight state, according to an embodiment of the disclosure.

At least specific operations of the operations shown in FIG. 14 may be omitted. At least specific operations mentioned with reference to other drawings in the disclosure may be further added before or after at least specific operations shown in FIG. 14.

The operations shown in FIG. 14 may be performed by the processor 120 (e.g., the processor 120 of FIG. 1). For example, the memory 130 (e.g., the memory 130 of FIG. 1) of the electronic device 101 may store instructions, when executed, that cause the processor 120 to perform at least specific operations shown in FIG. 14.

In the disclosure, when the electronic device 101 is in a backlight state, the stat may refer to a state in which the direction of the first illuminance sensor 631 (i.e., the direction in which the first illuminance sensor 631 receives light) positioned in the same direction as the display 620 and the direction of sunlight (or lighting) are opposite to each other. According to one embodiment, in case that the electronic device 101 is in a backlight state, operation 1410 may be performed.

In operation 1410, the electronic device 101 according to one embodiment may configure the brightness of the display 620 at the first brightness, based on the first front-surface sensing value. For example, when the display 620 is turned on for the first time, the electronic device 101 detects a first front-surface sensing value corresponding to 50 lux. In this case, the electronic device 101 may configure the brightness of the display 620 to 112 nits, which is a luminance corresponding to 50 lux, with reference to the first LUT 611. According to one embodiment, operation 1410 may be substantially the same as operation 710 described with reference to FIG. 7.

In operation 1420, the electronic device 101 according to one embodiment may confirm that no change occurs in the first front-surface sensing value. According to one embodiment, the electronic device 101 may determine whether the first front-surface sensing value serving as a reference for configuring the current brightness of the display 620 maintains the initial wake-up illuminance state. For example, while the brightness of the display 620 is configured to 112 nits, which is a luminance corresponding to 50 lux, the electronic device 101 determines whether a first voltage is maintained at 50 lux (alternatively, a change value from 50 lux is less than a reference value).

In operation 1430, the electronic device 101 according to one embodiment may compare the first front-surface sensing value with the second rear-surface sensing value obtained through the second illuminance sensor 632 while the first front-surface sensing value is maintained with no change. According to one embodiment, in case that the second rear-surface sensing value is greater than the first front-surface sensing value (e.g., the result of operation 1430 is "Yes"), the electronic device 101 may perform operation 1440. According to one embodiment, in case that the second rear-surface sensing value is less than or equal to the first front-surface sensing value (e.g., the result of operation 1430 is "No"), the electronic device 101 may perform operation 1410 again.

According to one embodiment, in case that the second rear-surface sensing value greater than the first front-surface sensing value is detected while the first front-surface sensing value is maintained, the electronic device 101 may determine that the electronic device 101 is in a backlight state and may perform operation 1440.

In operation 1440, the electronic device 101 according to one embodiment may adjust the brightness of the display 620, based on the second rear-surface sensing value and the wake-up illuminance in the first LUT 611. For example, the electronic device 101 compares the wake-up illuminance stored in the first LUT 611 with the second rear-surface sensing value. According to one embodiment, the electronic device 101 may immediately adjust the brightness of the display 620, based on the second rear-surface sensing value and the wake-up illuminance in the first LUT 611. For example, the electronic device 101 directly changes the brightness of the display 620 without performing a brightness adjustment operation on the display 620, based on the down hysteresis and/or the high hysteresis.

According to one embodiment, the electronic device 101 may refer to the luminance of the display 620 and the illuminance corresponding to the second rear-surface sensing value among the plurality of wake-up illuminances stored in the first LUT 611, and may configure the brightness of the display 620 to the corresponding luminance. For example, while the brightness of the display 620 is configured to 112 nits, based on the front-surface sensing value of 50 lux, the electronic device 101 determines whether the electronic device 101 is in a backlight state, as in operation 1430. In case that the electronic device 101 is switched to the backlight state and detects a second rear-surface sensing value of 500 lux which is higher than 50 lux, the luminance of the display 620 may be changed from 112 nits to 157 nits mapped to wake-up illuminance of 500 lux in the first LUT 611.

In operation 1450, the electronic device 101 according to one embodiment may adjust or maintain the brightness of the display 620, based on the first LUT 611 and a change in the second rear-surface sensing value. For example, the electronic device 101 compares the third rear-surface sensing value acquired after the second rear-surface sensing value with the down hysteresis stored in the first LUT 611.

According to one embodiment, in case that the third rear-surface sensing value is greater than the down hysteresis stored in the first LUT 611, the electronic device 101 may maintain the brightness of the display 620. For example, while the brightness of the display 620 is configured to 157 nits, the electronic device 101 acquires a third rear-surface sensing value having a value lower than 50 lux through the second illuminance sensor 632 and compares the third rear-surface sensing value with the down hysteresis of 60 lux stored in the first LUT 611. In case that the third rear-surface sensing value is greater than or equal to 60 lux and less than 500 lux, the electronic device 101 may maintain the brightness of the display 620 at 157 nits.

According to an embodiment, in case that the third rear-surface sensing value is less than or equal to the down hysteresis stored in the first LUT 611, the electronic device 101 may adjust the brightness of the display 620 to a value lower than the first brightness. For example, after the brightness of the display 620 is adjusted to 157 nits, the electronic device 101 acquires a third rear-surface sensing value having a value lower than 500 lux through the second illuminance sensor 632 and may compare the third rear-surface sensing value with the down hysteresis of 60 lux stored in the first LUT 611. In case that the third rear-surface sensing value is less than or equal to 60 lux, the electronic device 101 may adjust the brightness of the display 620 from 157 nits to 115 nits.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a housing;
a display disposed in a first direction of the housing;
a first illuminance sensor disposed in the first direction of the housing;
a second illuminance sensor disposed in a second direction of the housing opposite to the first direction;
a memory disposed in an inner space of the housing; and
a processor disposed in the inner space of the housing,
wherein the processor is configured to:
configure a brightness of the display to a first brightness, based on a first front-surface sensing value detected through the first illuminance sensor,
acquire a second front-surface sensing value smaller than the first front-surface sensing value through the first illuminance sensor while the brightness of the display is the first brightness,
compare the second front-surface sensing value with a first rear-surface sensing value detected through the second illuminance sensor,
in case that the second front-surface sensing value is greater than or equal to the first rear-surface sensing value, determine whether a touch input is detected through a designated region of the display,
maintain the brightness of the display at the first brightness in case that the touch input is detected, and
in case that the touch input is not detected, adjust the brightness of the display to a value lower than that of the first brightness, based on a first lookup table (LUT) stored in the memory, or maintains the brightness of the display at the first brightness.

2. The electronic device of claim 1, wherein the designated region corresponds to at least a portion of the display positioned within a designated distance from the first illuminance sensor.

3. The electronic device of claim 1,
wherein the first LUT comprises a plurality of first down hysteresis values mapped to a plurality of illuminance values, and
wherein the processor is further configured to:
in case the touch input is not detected, compare the second front-surface sensing value with a first down hysteresis value, mapped to the first brightness, among the plurality of first down hysteresis values,
maintain the brightness of the display at the first brightness in case that the second front-surface sensing value is greater than the first down hysteresis value mapped to the first brightness, and
change the brightness of the display to a second specified brightness, which is lower than the first brightness, in case that the second front-surface sensing value is less than or equal to the first down hysteresis value mapped to the first brightness.

4. The electronic device of claim 1, wherein in case that the second front-surface sensing value is smaller than the first rear-surface sensing value, the processor is further configured to:
store the first front-surface sensing value and the first rear-surface sensing value in the memory,
configure the first front-surface sensing value as a first variable,
configure the first rear-surface sensing value as a second variable,
determine using a motion sensor whether the direction of the display is at an acute angle with respect to the direction of gravity, and
in case that the direction of the display is at an acute angle with respect to the direction of gravity, adjust the brightness of the display to a value lower than that of the first brightness, based on the second variable and the first LUT, or maintain the brightness of the display at the first brightness.

5. The electronic device of claim 4,
wherein in case that the direction of the display is not at an acute angle with respect to the direction of gravity, the processor determines whether the first variable and the second variable satisfy a specified condition, and
wherein the determining by the processor whether the specified condition is satisfied comprises:
in case that the second variable is greater than a first reference value and a ratio of the first variable to the second variable is less than or equal to a second reference value, determining that a first specified condition is satisfied, and
in case the second variable is less than or equal to the first reference value or the ratio of the first variable to the second variable is greater than the second reference value, determining that a second specified condition is satisfied.

6. The electronic device of claim 5, wherein in case that the first variable and the second variable satisfy the first specified condition, the processor is further configured to:
configure a third variable by applying a specified weight to the second variable,
update the third variable by selecting a smaller value among the first variable and the third variable, and
maintain the brightness of the display at the first brightness or adjust the brightness of the display to a value lower than that of the first brightness, based on the third variable and a second LUT stored in the memory.

7. The electronic device of claim 6,
wherein the second LUT comprises a plurality of second down hysteresis values mapped to a plurality of illuminance values such that the plurality of second down hysteresis values are smaller than a plurality of first down hysteresis values included in the first LUT, and
wherein in case the first variable and the second variable satisfy the first specified condition, the processor is further configured to:
compare the third variable with a second down hysteresis value, mapped to the first brightness, among the plurality of second down hysteresis values,
maintain the brightness of the display at the first brightness in case that the third variable is greater than the second down hysteresis value mapped to the first brightness, and
change the brightness of the display to a third specified brightness, which is lower than the first brightness, in case that the third variable is less than or equal to the second down hysteresis value mapped to the first brightness.

8. The electronic device of claim 7, wherein in case that the first variable and the second variable satisfy the second specified condition, the processor is further configured to:
configure a third variable by applying a specified weight to the second variable,
update the third variable by selecting a smaller value among the first variable and the third variable, and
maintain the brightness of the display at the first brightness or adjust the brightness of the display to a value, which is lower than that of the first brightness, based on the third variable and a third LUT stored in the memory.

9. The electronic device of claim 8,
wherein the third LUT comprises a plurality of third down hysteresis values mapped to a plurality of illuminance values such that the plurality of third down hysteresis values are smaller than the plurality of second down hysteresis values in the second LUT stored in the memory, and
wherein in case that the first variable and the second variable satisfy the second specified condition, the processor is further configured to:
maintain the brightness of the display at the first brightness in case that the third variable is greater than 0 lux, and
change the brightness of the display to a fourth specified brightness, which is lower than the first brightness, in case that the third variable is 0 lux.

10. The electronic device of claim 1, wherein the processor is further configured to:
while the brightness of the display is the first brightness and the first front-surface sensing value is maintained through the first illuminance sensor, compare the first front-surface sensing value with a second rear-surface sensing value detected through the second illuminance sensor; and
adjust the brightness of the display, based on wake-up illuminance included in the first LUT, in case that the second rear-surface sensing value is greater than or equal to the first front-surface sensing value.

11. A method of an electronic device, the method comprising:

configuring a brightness of a display to a first brightness, based on a first front-surface sensing value detected through a first illuminance sensor disposed in a first direction of a housing;

acquiring a second front-surface sensing value smaller than the first front-surface sensing value through the first illuminance sensor while the brightness of the display is the first brightness;

comparing the second front-surface sensing value with a first rear-surface sensing value detected through a second illuminance sensor disposed in a second direction of the housing, the second direction being opposite to the first direction;

in case that the second front-surface sensing value is greater than or equal to the first rear-surface sensing value, determining whether a touch input is detected through a designated region of the display;

maintaining the brightness of the display at the first brightness in case that the touch input is detected; and in case the touch input is not detected, adjusting the brightness of the display to a value lower than that of the first brightness, based on a first lookup table (LUT) stored in a memory, or maintaining the brightness of the display at the first brightness.

12. The method of claim 11, wherein the designated region corresponds to at least a portion of the display positioned within a designated distance from the first illuminance sensor.

13. The method of claim 11,
wherein the first LUT comprises a plurality of first down hysteresis values mapped to a plurality of illuminance values, and
wherein the method further comprises:
in case the touch input is not detected, comparing the second front-surface sensing value with a first down hysteresis value, mapped to the first brightness, among the plurality of first down hysteresis values,
maintaining the brightness of the display at the first brightness in case that the second front-surface sensing value is greater than the first down hysteresis value mapped to the first brightness, and
changing the brightness of the display to a second specified brightness, which is lower than the first brightness, in case that the second front-surface sensing value is less than or equal to the first down hysteresis value mapped to the first brightness.

14. The method of claim 11, further comprising, based on confirmation that the second front-surface sensing value is smaller than the first rear-surface sensing value:
storing the first front-surface sensing value and the first rear-surface sensing value in the memory;
configuring the first front-surface sensing value as a first variable;
configuring the first rear-surface sensing value as a second variable;
determining using a motion sensor whether the direction of the display is at an acute angle with respect to the direction of gravity; and
in case that the direction of the display is at an acute angle with respect to the direction of gravity, adjusting the brightness of the display to a value lower than that of the first brightness, based on the second variable and the first LUT, or maintaining the brightness of the display at the first brightness.

15. The method of claim 14, further comprising, in case that the direction of the display is not at an acute angle with respect to the direction of gravity, determining whether the first variable and the second variable satisfy a specified condition,
wherein the determining whether the specified condition is satisfied comprises:
in case that the second variable is greater than a first reference value and a ratio of the first variable to the second variable is less than or equal to a second reference value, determining that a first specified condition is satisfied, and
in case the second variable is less than or equal to the first reference value or the ratio of the first variable to the second variable is greater than the second reference value, determining that a second specified condition is satisfied.

16. The method of claim 15, wherein in case that the first variable and the second variable satisfy the first specified condition, further comprising:
configuring a third variable by applying a specified weight to the second variable,
updating the third variable by selecting a smaller value among the first variable and the third variable, and
maintaining the brightness of the display at the first brightness or adjust the brightness of the display to a value lower than that of the first brightness, based on the third variable and a second LUT stored in the memory.

17. The method of claim 16,
wherein the second LUT comprises a plurality of second down hysteresis values mapped to a plurality of illuminance values such that the plurality of second down hysteresis values are smaller than a plurality of first down hysteresis values included in the first LUT, and
wherein in case the first variable and the second variable satisfy the first specified condition, further comprising:
comparing the third variable with a second down hysteresis value, mapped to the first brightness, among the plurality of second down hysteresis values,
maintaining the brightness of the display at the first brightness in case that the third variable is greater than the second down hysteresis value mapped to the first brightness, and
changing the brightness of the display to a third specified brightness, which is lower than the first brightness, in case that the third variable is less than or equal to the second down hysteresis value mapped to the first brightness.

18. The method of claim 17, wherein in case that the first variable and the second variable satisfy the second specified condition, further comprising:
configuring a third variable by applying a specified weight to the second variable,
updating the third variable by selecting a smaller value among the first variable and the third variable, and
maintaining the brightness of the display at the first brightness or adjust the brightness of the display to a value, which is lower than that of the first brightness, based on the third variable and a third LUT stored in the memory.

19. The method of claim 18,
wherein the third LUT comprises a plurality of third down hysteresis values mapped to a plurality of illuminance values such that the plurality of third down hysteresis values are smaller than the plurality of second down hysteresis values in the second LUT stored in the memory, and wherein in case that the first variable and the second variable satisfy the second specified condition, further comprising:
- maintaining the brightness of the display at the first brightness in case that the third variable is greater than 0 lux, and
- changing the brightness of the display to a fourth specified brightness, which is lower than the first brightness, in case that the third variable is 0 lux.

20. The method of claim 11, further comprising:
while the brightness of the display is the first brightness and the first front-surface sensing value is maintained through the first illuminance sensor, comparing the first front-surface sensing value with a second rear-surface sensing value detected through the second illuminance sensor; and
adjusting the brightness of the display, based on wake-up illuminance included in the first LUT, in case that the second rear-surface sensing value is greater than or equal to the first front-surface sensing value.

* * * * *